(12) United States Patent
Blüm et al.

(10) Patent No.: US 12,104,003 B2
(45) Date of Patent: Oct. 1, 2024

(54) POLYESTER-POLYETHER-MODIFIED POLYBUTADIENES AND PROCESSES FOR PREPARATION THEREOF

(71) Applicant: Evonik Operations GmbH, Essen (DE)

(72) Inventors: Jana Blüm, Essen (DE); Michael Fiedel, Essen (DE); Annett Halbhuber, Krefeld (DE); Stefanie Redeker, Hattingen (DE); Frank Schubert, Neukirchen-Vluyn (DE); Sarah Otto, Essen (DE)

(73) Assignee: Evonik Operations GmbH, Essen (DE)

( * ) Notice: Subject to any disclaimer, the term of this patent is extended or adjusted under 35 U.S.C. 154(b) by 150 days.

(21) Appl. No.: 17/664,951

(22) Filed: May 25, 2022

(65) Prior Publication Data

US 2022/0403063 A1    Dec. 22, 2022

(30) Foreign Application Priority Data

May 27, 2021 (EP) ..................................... 21176161

(51) Int. Cl.
*C08F 8/08* (2006.01)
*C08F 136/06* (2006.01)

(52) U.S. Cl.
CPC .............. *C08F 8/08* (2013.01); *C08F 136/06* (2013.01)

(58) Field of Classification Search
CPC ........... C08F 279/02; C08F 8/08; C08C 19/06
See application file for complete search history.

(56) References Cited

U.S. PATENT DOCUMENTS

| | | | |
|---|---|---|---|
| 3,725,492 | A | 4/1973 | Ukita et al. |
| 4,182,814 | A | 1/1980 | Bernemann et al. |
| 4,239,807 | A | 12/1980 | Feldmann et al. |
| 4,283,313 | A | 8/1981 | Omika et al. |
| 4,900,544 | A | 2/1990 | Ritter et al. |
| 4,994,621 | A | 2/1991 | Yeakey et al. |
| 6,218,477 | B1 | 4/2001 | Paulen et al. |
| 6,353,060 | B1 | 3/2002 | Paulen et al. |
| 8,921,437 | B2 | 12/2014 | Knott et al. |
| 9,550,928 | B2 | 1/2017 | Lobert et al. |
| 10,087,278 | B2 | 10/2018 | Lobert et al. |
| 10,851,189 | B2 | 12/2020 | Kranning et al. |
| 11,365,270 | B2 | 6/2022 | Kranning et al. |
| 2010/0071849 | A1 | 3/2010 | Knott et al. |
| 2015/0307640 | A1 | 10/2015 | Berlineanu et al. |
| 2016/0053145 | A1 | 2/2016 | Lobert et al. |
| 2017/0226285 | A1 | 8/2017 | Lobert et al. |
| 2018/0037693 | A1 | 2/2018 | Eling et al. |
| 2019/0315895 | A1 | 10/2019 | Kranning et al. |
| 2021/0024666 | A1 | 1/2021 | Kranning et al. |
| 2023/0018204 | A1 | 1/2023 | Schubert et al. |

FOREIGN PATENT DOCUMENTS

| | | |
|---|---|---|
| CN | 101538338 | 9/2009 |
| DE | 2053484 | 5/1972 |
| DE | 2158878 | 6/1973 |
| DE | 2526366 | 12/1976 |
| DE | 2731067 | 1/1979 |
| DE | 2943879 | 5/1980 |
| DE | 3014196 | 10/1981 |
| DE | 206286 | 1/1984 |
| DE | 3305964 | 8/1984 |
| DE | 3442200 | 5/1986 |

(Continued)

OTHER PUBLICATIONS

Decher, Polymer International 38 (1995) 219-225 (Year: 1995).*
Yamashita, Journal of Polymer Science: Part A: Poplymer Chemistry, vol. 31, 2437-2444 (1993) (Year: 1993).*
Hazer, Macromol. Chem. Phys. 196, 1945-1952 (1995) (Year: 1995).*
Gao, Macromol. Chem. Phys. 2013, 214, 1677-1687 (Year: 2013).*
Translation of JP 2002-105209 (Year: 2002).*
U.S. Appl. No. 14/410,326, Dec. 22, 2014, Berlineanu et al.
U.S. Office Action dated Jun. 23, 2023, in U.S. Appl. No. 17/756,423, 14 pages.
U.S. Appl. No. 17/756,423, May 25, 2022, Schubert et al.
Decher et al., "New Amphiphilic Poly(butadiene)-graft-Poly(ethylene oxide)s", Polymer International, vol. 38, 1995, pp. 219-225.
Extended European Search Report for European Patent Application No. 21176161.4, mailed on Nov. 25, 2021, 5 pages.

(Continued)

*Primary Examiner* — Robert C Boyle
(74) *Attorney, Agent, or Firm* — Grüneberg and Myers PLLC

(57) ABSTRACT

Compounds are based on polyether-modified polybutadiene, where the polyether-modified polybutadiene contains repeat units selected from the divalent radicals:

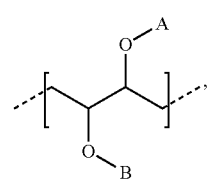

(U)

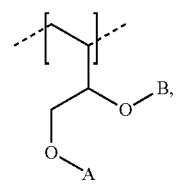

(V)

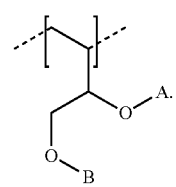

(W)

The radical B has at least one ester group.

24 Claims, 1 Drawing Sheet

(56) References Cited

FOREIGN PATENT DOCUMENTS

| | | |
|---|---|---|
| DE | 253627 | 1/1988 |
| EP | 0 351 135 | 1/1990 |
| EP | 2 003 156 | 12/2008 |
| EP | 2805981 | 11/2014 |
| JP | 53-117030 | 10/1978 |
| JP | 2002-105209 * | 4/2002 |
| JP | 2004-346310 | 12/2004 |
| JP | 2011-38003 | 2/2011 |
| WO | 2012/130674 | 10/2012 |
| WO | 2014/075901 | 5/2014 |
| WO | 2016/142249 | 9/2016 |
| WO | 2021/105037 | 6/2021 |
| WO | 2022/073823 | 4/2022 |

OTHER PUBLICATIONS

Gao et al., "Facile Synthesis of Amphiphilic Heterografted Copolymers with Crystalline and Amorphous Side Chains", Macromolecular Chemistry and Physics, vol. 214, 2013, pp. 1677-1687.
Gao et al., "Synthesis of Low Molecular Distribution Dihydric Polybutadiene in the Presence of Triflic Acid", Journal of Macromolecular Science, Part A, Pure and Applied Chemistry, vol. 50, No. 3, 2013, pp. 297-301.
Wang et al., "Conductive Performances of Elastomeric Electrolytes Based on Maleic Anhydride-g-poly(1, 2-butadiene) Grafting Polyethylene Glycol 400 and $LiClO_4$ ", Journal of Applied Polymer Science, 2013, pp. 2408-2413.

* cited by examiner

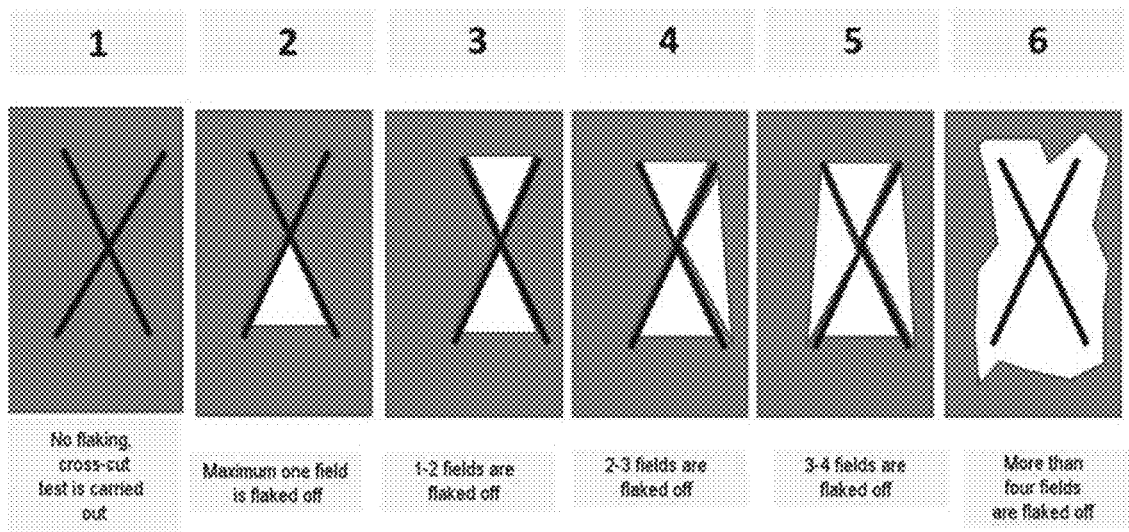

POLYESTER-POLYETHER-MODIFIED POLYBUTADIENES AND PROCESSES FOR PREPARATION THEREOF

CROSS-REFERENCE TO RELATED APPLICATIONS

This application claims priority to European Application No. 21176161.4, filed on May 27, 2021, the content of which is hereby incorporated by reference in its entirety.

BACKGROUND OF THE INVENTION

Field of the Invention

The present invention relates to polybutadienes that are polyester-polyether-modified in comb positions (pendantly) and to processes for preparation thereof and also to use thereof.

Description of Related Art

Polybutadienes having pendant polyether radicals are known and are prepared according to the prior art, for example, by a reaction of reactive functionalized polybutadienes with polyethers. For instance, Q. Gao et. al. In Macromolecular Chemistry and Physics (2013), 214(15), 1677-1687 describe amphiphilic polymer comb structures that are prepared by grafting polyethylene glycol onto a main polybutadiene chain. According to JP 2011038003, polybutadienes functionalized with maleic anhydride units are reacted with amino-terminated polyethers. The result is maleinized polybutadienes having polyether radicals in comb positions, attached via an amide or imide group. In a similar process, according to J. Wang, Journal of Applied Polymer Science (2013), 128(4), 2408-2413, polyethylene glycols are added onto polybutadienes having a high proportion of 1,2-butadiene monomer units to form an ester linkage. High molecular weight graft polymers having comb structure are obtained by the process disclosed in JP 2002105209 by an addition of epoxidized polybutadienes with OH-functional polyethers. H. Decher et al., according to Polymer International (1995), 38(3), 219-225, use the addition of isocyanate-terminated polyethylene glycols onto hydroxy-functional polybutadienes.

Also known are processes for preparing polyether-modified polybutadienes in which hydroxy-functional polybutadienes are reacted with epoxy compounds. For example, the prior art discloses the alkoxylation of OH-terminated polybutadienes.

U.S. Pat. No. 4,994,621 A describes, for example, the alkoxylation of hydroxy-terminated polybutadienes with ethylene oxide and propylene oxide in the presence of tetramethylammonium hydroxide. EP 2003158 A1 states that the alkali-catalysed alkoxylation of OH-terminated polybutadienes is barely possible for structural reasons and as a result of the poor solubility of alkaline catalysts, and instead prefers double metal cyanide (DMC) catalysis. The use of OH-terminated polybutadienes in alkoxylation leads exclusively to polyether-polybutadiene-polyether triblock structures. According to EP 2003156 A1, this block structure is responsible for the poor miscibility with other reaction components in the preparation of polyurethanes.

As well as the alkoxylation of OH-terminated polybutadienes, the alkoxylation of pendantly hydroxy-functional polybutadienes is also known. For instance, Q. Gao et. al. in Macromolecular Chemistry and Physics (2013), 214(15), 1677-1687 describe the preparation of a pendantly polyether-modified polybutadiene by alkoxylation of a pendantly hydroxy-functional polybutadiene with ethylene oxide. The pendantly hydroxy-functional polybutadiene used here is prepared first by epoxidation of a polybutadiene, followed by reaction of the epoxidized polybutadiene with a lithium-polybutadiene compound, and finally protonation of the reaction product with methanolic HCl. This process leads to a polybutadiene having both pendant polyether radicals, and also pendant polybutadiene radicals. Since there is always a polybutadiene radical for every polyether radical here, this process leads to polyether-modified polybutadienes having low HLB values (HLB~hydrophilic lipophilic balance). Moreover, the polyether-modified polybutadienes are branched in the polybutadiene moiety. Polyether-modified polybutadienes having higher HLB values and/or an unbranched polybutadiene moiety are not preparable by this process. A further disadvantage of the process is the use of organometallic compounds (n-BuLi and lithium-polybutadiene), which places particular demands on the process regime owing to their high air and moisture sensitivity This makes it difficult to implement this process industrially. The prior art to date has not disclosed any process for preparing preferably linear polybutadienes having pendant polyether chains by a simple direct alkoxylation reaction of pendantly hydroxy-functional polybutadienes with alkylene oxides, wherein the pendantly hydroxy-functional polybutadienes are prepared from epoxy-functional polybutadienes without use of organometallic compounds such as lithium-polybutadiene. In summary, it can be stated that the prior art to date has not disclosed any process for preparing linear polybutadienes with polyether chains in comb positions by a simple, direct alkoxylation reaction with alkylene oxides.

The chemical modification of polybutadiene with the aid of epoxidation and further reactions is known from the literature. The epoxy ring opening usually takes place by a reaction with amines. JP 53117030 and DE 2943879 describe the addition of ethanolamine or diethanolamine, EP 351135 and DE 3305964 the reaction of the epoxy groups with dimethylamine. DD 206286 discloses the addition of primary and secondary amines having 4 to 20 carbon atoms onto epoxidized polybutadienes in polar solvents. Also known is the modification of polybutadiene with fatty acids. For instance, DE 3442200 describes the addition of $C_6$-$C_{22}$ carboxylic acids onto epoxidized polybutadiene. No further alkoxylation of the reaction products is disclosed in these documents.

In the context of the present invention, amine-functional polybutadienes are not very suitable as starter compounds for the alkoxylation since they impart an often undesirable basic character to the products, cause discoloration or, for example, inhibit alkoxylation catalysts such as double metal cyanides.

According to the prior art, the addition of alcohols and water onto epoxidized polybutadiene seems to be far more difficult than the addition of amines and carboxylic acids. Qing Gao et. al. in J. Macromol. Sci., Part A: Pure and Applied Chemistry (2013), 50, 297-301 describe the trifluoromethanesulfonic acid-catalysed addition of water onto epoxidized polybutadienes in THF. The aim of WO 2016/142249 A1 is the preparation of vitreous polymers by addition of water or alcohols having 1 to 4 carbon atoms onto the epoxy groups of polybutadiene, and is limited to the preparation of OH-functional polybutadienes having low molar masses or 300 to 2000 g/mol and a high content of 50% to 80% of 1,2-vinylic and 1,2-cyclovinylic double bonds.

Polybutadienes and modified polybutadienes are in many cases used as reactive component or formulation constituent in order, for example, to render polymers hydrophobic or to flexibilize them and improve mechanical properties. At present, however, there are frequently limits to the possible uses of alkoxylated polyether-modified polybutadienes as a result of the restriction to a small number of available triblock structures. There has therefore been no way of varying to a large degree the chemical makeup of the polyether-modified polybutadienes. Moreover, there is no simple preparation process for such polymers.

The as yet unpublished European patent application EP 19212068.5 or PCT/EP2020/083013 is dedicated to the preparation of polyether-modified polybutadienes and also to polyether-modified polybutadienes that may be prepared in accordance with said process, wherein the process comprises the following steps:
  a) reacting at least one polybutadiene (A) with at least one epoxidizing reagent (B) to give at least one epoxy-functional polybutadiene (C);
  b) reacting the at least one epoxy-functional polybutadiene (C) with at least one hydroxy-functional compound (D) to give at least one hydroxy-functional polybutadiene (E);
  c) reacting the at least one hydroxy-functional polybutadiene (E) with at least one epoxy-functional compound (F) to give at least one polyether-modified polybutadiene (G).

SUMMARY OF THE INVENTION

The polyether-modified polybutadienes according to the invention are thus obtainable by direct alkoxylation of pendantly hydroxy-functional polybutadienes and have polyether radicals in pendant (comb) positions.

It has been found that the pendantly (in comb position) polyether-modified polybutadienes prepared in accordance with this teaching are ideally suited as defoamers and/or adhesion promoters for lacquers and paints.

The question therefore arises as to whether it is possible to optimize the said polyether-modified polybutadiene in order to improve the use thereof in the paint and lacquer sector.

Based on the teaching or the European patent application EP 19212068.5 or PCT/EP2020/083013, the present invention proposes a compound based on polyether-modified polybutadiene, wherein the polyether-modified polybutadiene comprises repeat units selected from the group consisting of the divalent radicals

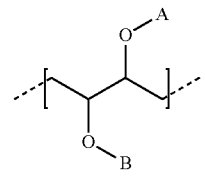
(U)

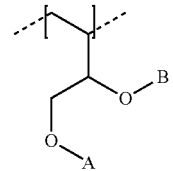
(V)

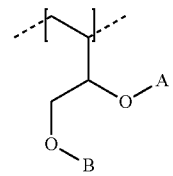
(W)

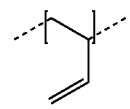
(X)

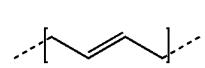
(Y)

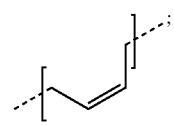
(Z)

where
A is in each case independently a monovalent organic radical or a hydrogen radical, preferably in each case independently selected from the group consisting of monovalent hydrocarbon radicals having 1 to 6 carbon atoms,
  more preferably in each case independently selected from the group consisting of alkyl radicals having 1 to 4 carbon atoms;
B is in each case independently selected from the group consisting of radicals of the formula (4a)

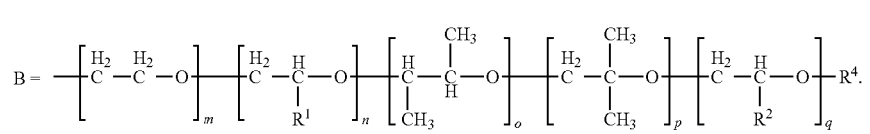

Formula (4a)

preferably in each case independently selected from the group consisting of radicals of the formula (4b)

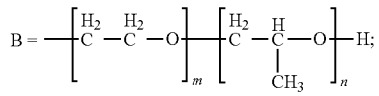

Formula (4b)

$R^1$ is in each case independently selected from the group consisting of monovalent hydrocarbon radicals having 1 to 16 carbon atoms,
  preferably in each case independently an alkyl radical having 1 to 16 carbon atoms or a phenyl radical,
  more preferably in each case independently a methyl radical, an ethyl radical or a phenyl radical;
$R^2$ is a radical of the formula —$CH_2$—O—$R^3$;
$R^3$ is in each case independently selected from the group consisting or monovalent hydrocarbon radicals having 3 to 18 carbon atoms:
  preferably in each case independently an allyl radical, a butyl radical, an alkyl radical having 8 to 15 carbon atoms or a phenyl radical that may be substituted by monovalent radicals selected from hydrocarbon radicals having 1 to 4 carbon atoms;
  more preferably a tert-butylphenyl radical or an o-cresyl radical;
$R^4$ is hydrogen
and
m, n, o, p and q are each independently 0 to 300, preferably 0 to 200, more preferably 0 to 100, with the proviso that the sum total of m, n, o, p and q is greater than 1, preferably greater than 5, more preferably greater than 10;
including every permutation of the repeat units (U), (V), (W), (X), (Y) and (Z) and of the repeat units in the B radical, with the proviso that the sum total of all repeat units (U), (V) and (W) divided by the sum total of all repeat units (U), (V), (W), (X), (Y) and (Z) is >0%, wherein
the radical B has at least one ester group.

The invention also includes the following embodiments:
1. Compounds based on polyether-modified polybutadiene, wherein the polyether-modified polybutadiene comprises repeat units selected from the group consisting of the divalent radicals

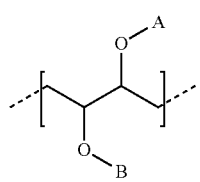 (U)

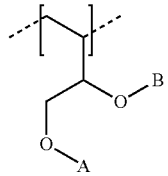 (V)

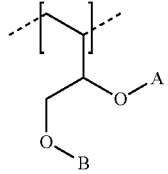 (W)

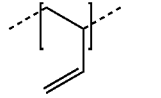 (X)

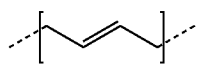 (Y)

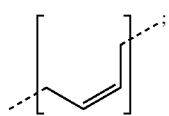 (Z)

where
A is in each case independently a monovalent organic radical or a hydrogen radical, preferably in each case independently selected from the group consisting of monovalent hydrocarbon radicals having 1 to 6 carbon atoms,
  more preferably in each case independently selected from the group consisting of alkyl radicals having 1 to 4 carbon atoms:
B is in each case independently selected from the group consisting of radicals of the formula (4a)

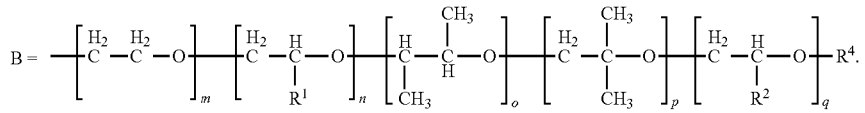

Formula (4a)

preferably in each case independently selected from the group consisting of radicals of the formula (4b)

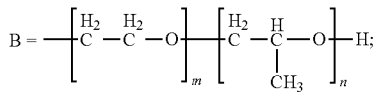

Formula (4b)

$R^1$ is in each case independently selected from the group consisting of monovalent hydrocarbon radicals having 1 to 16 carbon atoms, preferably in each case independently an alkyl radical having 1 to 16 carbon atoms or a phenyl radical,
more preferably in each case independently a methyl radical, an ethyl radical or a phenyl radical:
$R^2$ is a radical of the formula —$CH_2$—O—$R^3$;
$R^3$ is in each case independently selected from the group consisting of monovalent hydrocarbon radicals having 3 to 18 carbon atoms;
preferably in each case independently an allyl radical, a butyl radical, an alkyl radical having 8 to 15 carbon atoms or a phenyl radical that may be substituted by monovalent radicals selected from hydrocarbon radicals having 1 to 4 carbon atoms;
more preferably a tert-butylphenyl radical or an o-cresyl radical;
$R^4$ is hydrogen;
and
m, n, o, p and q are each independently 0 to 300, preferably 0 to 200, more preferably 0 to 100, with the proviso that the sum total of m, n, o, p and q is greater than 1, preferably greater than 5, more preferably greater than 10;
including every permutation of the repeat units (U), (V), (W), (X), (Y) and (Z) and of the repeat units in the B radical, with the proviso that the sum total of all repeat units (U), (V) and (W) divided by the sum total of all repeat units (U), (V), (W), (X), (Y) and (Z) is >0%, characterized in that the radical B has at least one ester group.

2. Compound according to embodiment 1, characterized in that the ester group is formed by reacting the radicals B with compounds (1) selected from the group consisting of cyclic anhydrides, lactones, dilactides or cyclic carbonates as monomers or comonomers, wherein the compound has repeat units selected from the group consisting of the radicals

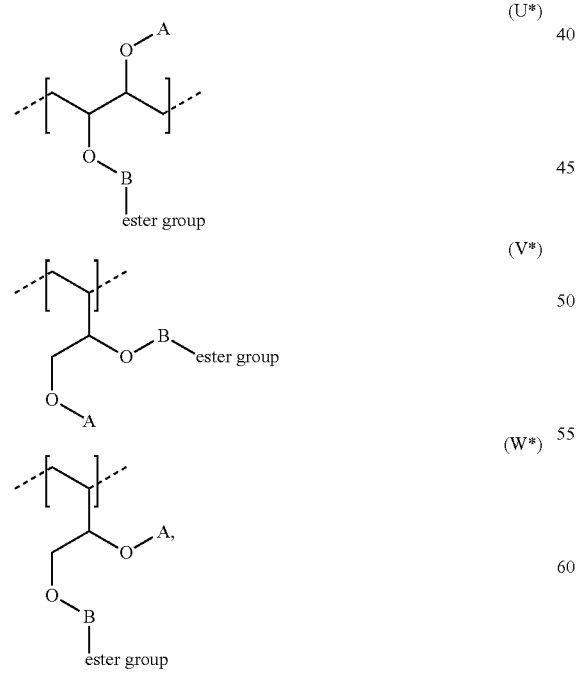

3. Compound according to either of the preceding embodiments, characterized in that cyclic anhydrides, in pure form or in any desired mixtures, are selected from the group consisting of saturated, unsaturated or aromatic cyclic dicarboxylic anhydrides, preferably succinic anhydride, oct(en)yl-, dec(en)yl- and dodec(en)ylsuccinic anhydride, maleic anhydride, itaconic anhydride, glutaric anhydride, adipic anhydride, citraconic anhydride, trimellitic anhydride, phthalic anhydride, hexahydro-, tetrahydro-, dihydro-, methylhexahydro- and methyltetrahydrophthalic anhydride.

4. Compound according to any of the preceding embodiments, characterized in that lactones, in pure form or in any desired mixtures, are selected from the group consisting of valerolactones, caprolactones and butyrolactones, which may be unsubstituted or substituted by organic radicals, preferably methyl groups, preferably ε-caprolactone or δ-valerolactone.

5. Compound according to any of the preceding embodiments, characterized in that the sum total of all repeat units (U), (V) and (W) divided by the sum total of all repeat units (U), (V), (W), (X), (Y) and (Z) is from >0% to 70%, preferably 1% to 50%, more preferably from 2% to 40%, even more preferably from 3% to 30%, especially preferably from 4% to 20%.

6. Compound according to any of the preceding embodiments, characterized in that the number-average molar mass $M_n$ of the polybutadiene moiety is from 200 g/mol to 20 000 g/mol, preferably from 500 g/mol to 10 000 g/mol, more preferably from 700 g/mol to 5000 g/mol.

7. Compound according to any of the preceding embodiments, characterized in that 0% to 80%, preferably 0% to 30%, particularly preferably 0% to 10%, especially preferably 0% to 5% of the double bonds present are 1,2 vinyl double bonds, and 20% to 100%, preferably 70% to 100%, particularly preferably 90% to 100%, especially preferably 95% to 100% of the double bonds present are 1,4 double bonds.

8. Compound according to any of the preceding embodiments, characterized in that the average molar mass of the radical B is from 100 g/mol to 20 000 g/mol, preferably from 200 g/mol to 15 000 g/mol, particularly preferably from 400 g/mol to 10 000 g/mol.

9. Process for preparing one or more polyether-modified polybutadienes, comprising the steps of:
a) reacting at least one polybutadiene (A) with at least one epoxidizing reagent (B) to give at least one epoxy-functional polybutadiene (C);
b) reacting the at least one epoxy-functional polybutadiene (C) with at least one hydroxy-functional compound (D) to give at least one hydroxy-functional polybutadiene (E);
c) reacting the at least one hydroxy-functional polybutadiene (E) with at least one epoxy-functional compound (F) to give at least one polyether-modified polybutadiene (G),
d) reacting the at least one polyether-modified polybutadiene (G) with at least one compound (1) to give at least one polyether-polyester-modified polybutadiene (H).

10. Process according to embodiment 9, further comprising the step of:
e) colour lightening of the at least one polyether-modified polybutadiene (G).

11. Process according to at least one of embodiments 9-10, characterized in that, of the double bonds of all the polybutadienes (A) used, 0% to 80% are 1,2 vinyl double bonds and 20% to 100% are 1,4 double bonds, preferably 0% to 30% are 1,2 vinyl double bonds and 70% to 100% are 1,4 double bonds, particularly preferably 0% to 10% are 1,2 vinyl double bonds and 90% to 100% are 1,4 double bonds, especially preferably 0% to 5% are 1,2 vinyl double bonds and 95% to 100% are 1,4 double bonds.

12. Process according to at least one of embodiments 9-11, characterized in that the number-average molar mass $M_n$ of the at least one polybutadiene (A) is from 200 g/mol to 20 000 g/mol, preferably from 500 g/mol to 10 000 g/mol, particularly preferably from 700 g/mol to 5000 g/mol.

13. Process according to at least one of embodiments 9-12, characterized in that >0% to 70%, preferably 1% to 50%, more preferably 2% to 40%, even more preferably 3% to 30% and especially preferably 4% to 20% of the double bonds of the at least one polybutadiene (A) are epoxidized.

14. Process according to at least one of embodiments 9-13, characterized in that the at least one epoxidizing reagent (B) comprises performic acid, which is preferably formed in situ from formic acid and hydrogen peroxide.

15. Process according to at least one of embodiments 9-14, characterized in that the at least one hydroxy-functional compound (D) is selected from the group of the monofunctional alcohols having 1 to 6 carbon atoms, preferably from the group of the monofunctional alcohols having 2 to 4 carbon atoms, particularly preferably from the group consisting of ethanol, 1-propanol, isopropanol, 1-butanol, 2-butanol and isobutanol.

16. Process according to at least one of embodiments 9-15, characterized in that, in step b), the total number of hydroxyl groups in all the hydroxy-functional compounds (D) to the total number of epoxy groups in all the epoxy-functional polybutadienes (C) is from >1:1 to 50:1, preferably from 2:1 to 35:1, further preferably 3:1 to 30:1, especially preferably from 3:1 to 25:1.

17. Process according to at least one of embodiments 9-16, characterized in that, in step b), an acid, preferably sulfuric acid, sulfonic acids and/or trifluoroacetic acid, particularly preferably trifluoromethanesulfonic acid, is used as catalyst.

18. Process according to at least one of embodiments 9-17, characterized in that the at least one epoxy-functional compound used in step c) is selected
  a. from the group of the alkylene oxides having 2 to 18 carbon atoms,
     preferably from the group of the alkylene oxides having 2 to 8 carbon atoms,
     more preferably selected from the group consisting of ethylene oxide, propylene oxide, 1-butylene oxide, cis-2-butylene oxide, trans-2-butylene oxide, isobutylene oxide and styrene oxide, and/or
  b. from the group of the glycidyl compounds,
     preferably from the group of the monofunctional glycidyl compounds,
     more preferably from the group consisting of phenyl glycidyl ether, o-cresyl glycidyl ether, tert-butylphenyl glycidyl ether, allyl glycidyl ether, butyl glycidyl ether, 2-ethylhexyl glycidyl ether, $C_{12}/C_{14}$ fatty alcohol glycidyl ether and $C_{13}/C_{15}$ fatty alcohol glycidyl ether.

19. Process according to at least one of embodiments 9-18, characterized in that an alkoxylation catalyst is used in step c), preferably selected from the group consisting of alkali metal hydroxides, alkali metal alkoxides, amines, guanidines, amidines, phosphines, $SnCl_4$, $SnCl_2$, $SnF_2$, $BF_3$, $BF_3$ complexes and double metal cyanide (DMC) catalysts, more preferably selected from the group consisting of Zn/Co double metal cyanide catalysts, amines, guanidines, amidines, alkali metal hydroxides and alkali metal alkoxides.

20. Process according to at least one of embodiments 9-19, characterized in that the at least one compound (I) used in step d) is selected from the group consisting of cyclic anhydrides, lactones, dilactides or cyclic carbonates as monomers or comonomers.

21. Process according to at least one of embodiments 9-20, characterized in that an initiator catalyst is used in step d), preferably selected from the group consisting of zirconium butoxide, tetraisopropyl titanate, tetrabutyl titanate or titanium(IV) 2-ethylhexyloxide, zinc acetate, potassium acetate, lithium acetate, sodium acetate, calcium acetate, barium acetate, magnesium acetate, copper acetate or cobalt acetate, zink/bismuth carboxylate, toluenesulfonic acid or trifluoroacetic acid, particularly preferably zirconium butoxide and titanium butoxide.

22. Composition comprising a compound according to any of embodiments 1-8.

23. Use of the composition according to embodiment 22 for producing coating materials, paints and lacquers, as printing ink or inkjet ink or else sealants and adhesives.

24. Use of the compound according to any of embodiments 1-8 as adhesion promoter, defoamer, dispersing additive, wetting aid or glide additive.

BRIEF DESCRIPTION OF THE DRAWING

The FIGURE shows an evaluation of the Andreas Cut test.

DETAILED DESCRIPTION OF THE INVENTION

Surprisingly, it has been found that the performance of the esterified polyether-modified polybutadienes according to the invention as adhesion promoters for example could be increased still further.

The ester group is preferably formed by reacting the B radicals with compounds selected from the group consisting of cyclic anhydrides, dilactides, lactones, or cyclic carbonates as monomers or comonomers.

After the reaction, the compound preferably comprises repeat units selected from the group consisting of the radicals

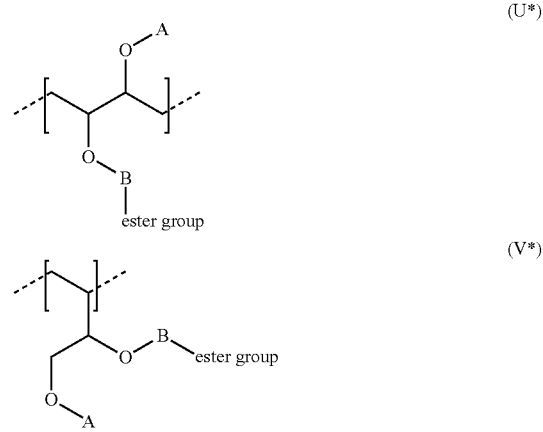

-continued

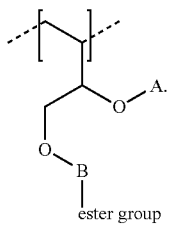

(W*)

ester group

The cyclic anhydrides, in pure form or in any desired mixtures, are preferably selected from the group consisting of saturated, unsaturated or aromatic cyclic dicarboxylic anhydrides, preferably succinic anhydride, oct(en)yl-, dec(en)yl- and dodec(en)ylsuccinic anhydride, maleic anhydride, itaconic anhydride, glutaric anhydride, adipic anhydride, citraconic anhydride, trimellitic anhydride, phthalic anhydride, hexahydro-, tetrahydro-, dihydro-, methylhexahydro- and methyltetrahydrophthalic anhydride.

The lactones, in pure form or in any desired mixtures, are preferably selected from the group consisting of valerolactones, caprolactones and butyrolactones, which may be unsubstituted or substituted by alkyl groups, preferably methyl groups, preferably ε-caprolactone or δ-valerolactone.

Compound according to the invention and polyester-polyether-modified polybutadiene are to be understood herein as synonyms.

The polyester-polyether-modified polybutadiene is preferably a linear polybutadiene, which has been modified in comb positions (pendantly) with polyether radicals which have been modified with at least one ester group. It is thus preferable that the polyester-polyether-modified polybutadiene has a linear polybutadiene backbone and pendant polyether radicals having at least one ester group.

The radicals $R^1$, $R^2$ and $R^3$ may each independently be linear or branched, saturated or unsaturated, aliphatic or aromatic, substituted or unsubstituted.

The general notation

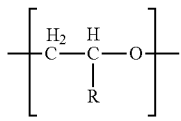

where $R=R^1$ or $R^2$ in formula (4a) or $R=CH_3$ in the formulae (4b) represents either a unit of the formula

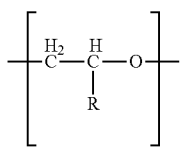

or a unit of the formula

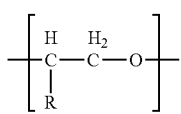

but preferably a unit of the formula

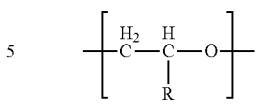

The general notation

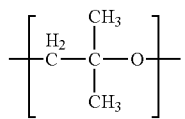

in formula (4a) represents either a unit of the formula

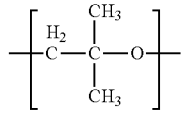

or a unit of the formula

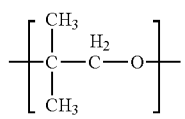

but preferably a unit of the formula

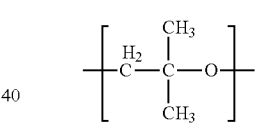

It is further preferable that the radical $R^4$ is a hydrogen.

It is preferable here that the sum total of all repeat units (U), (V) and (W) divided by the sum total of all repeat units (U), (V), (W), (X), (Y) and (Z) in the at least one polyester-polyether-modified polybutadiene (G) is from >0% to 70%, preferably from 1% to 50%, more preferably from 2% to 40%, even more preferably from 3% to 30%, especially preferably from 4% to 20%.

This means that >0% to 70%, preferably 1% to 50%, more preferably from 2% to 40%, even more preferably from 3% to 30%, especially preferably from 4% to 20%, of the entirety of the repeat units (U), (V), (W), (X), (Y) and (Z) are polyester-polyether-modified.

The number-average molar mass $M_n$, weight-average molar mass $M_w$ and polydispersity of the polybutadiene moiety of the polyester-polyether-modified polybutadiene are freely variable. The polybutadiene moiety is understood to mean the component of the polyester-polyether-modified polybutadiene that originates from the polybutadiene used in the process.

It is preferable that the number-average molar mass $M_n$ of the polybutadiene moiety of the polyester-polyether-modified polybutadiene is from 200 g/mol to 20 000 g/mol, preferably from 500 g/mol to 10 000 g/mol, especially preferably from 700 g/mol to 5000 g/mol.

Alternatively, it is preferable that the number-average molar mass $M_n$ of the polybutadiene moiety of the polyester-polyether-modified polybutadiene is from 2100 g/mol to 20 000 g/mol, more preferably from 2200 g/mol to 10 000 g/mol, especially preferably from 2300 g/mol to 5000 g/mol.

The number-average molar mass $M_n$ of the polybutadiene moiety is defined here as the number-average molar mass $M_n$ of the underlying polybutadiene.

It is further preferable that the polyester-polyether-modified polybutadiene has a numerical average of 5 to 360, particularly preferably 10 to 180, especially preferably 15 to 90 repeat units, where the repeat units are selected from the group consisting of (U), (V), (W), (X), (Y) and (Z).

Alternatively, it is preferable that the polyester-polyether-modified polybutadiene has an average of 35 to 360, particularly preferably 40 to 180, especially preferably 45 to 90 repeat units, where the repeat units are selected from the group consisting of (U), (V), (W), (X), (Y) and (Z).

It is further preferable that the polyester-polyether-modified polybutadienes are characterized in that 0% to 80%, preferably 0% to 30%, particularly preferably 0% to 10% and especially preferably 0% to 5% of the double bonds present are 1,2 vinyl double bonds, and 20% to 100%, preferably 70% to 100%, particularly preferably 90% to 100% and especially preferably 95% to 100% of the double bonds present are 1,4 double bonds.

Especially preferably preferred are those polyester-polyether-modified polybutadienes which are derived from the polybutadienes Polyvest® 110 and Polyvest® 130 from Evonik Industries AG/Evonik Operations GmbH and Lithene ultra AL and Lithene ActiV 50 from Synthomer PLC described above.

The molar mass and polydispersity of the B radicals is freely variable. However, it is preferable that the average molar mass of the B radicals is from 100 g/mol to 20 000 g/mol, preferably from 200 g/mol to 15 000 g/mol, more preferably from 400 g/mol to 10 000 g/mol. The average molar mass of the B radicals may be calculated from the starting weight of the monomers used based on the number of OH groups of the hydroxy-functional polybutadiene (E) used. Thus, for example, if 40 g of ethylene oxide is used and the amount of the hydroxy-functional polybutadiene (E) used is 0.05 mol of OH groups, the average molar mass of the B radical is 800 g/mol.

The polyester-polyether-modified polybutadienes are liquid, pasty or solid according to the composition and molar mass.

The number-average molar mass $M_n$ of the polyester-polyether-modified polybutadienes is preferably from 1000 g/mol to 6000 g/mol, further preferably from 1500 g/mol to 5000 g/mol, especially preferably from 2000 g/mol to 4000 g/mol.

Their polydispersity is variable within broad ranges. The polydispersity of the at least one polyester-polyether-modified polybutadiene, according to the GPC method against PPG standard, is preferably $M_w/M_n$=1.5 to 10, further preferably between 2 and 9, more preferably between 3 and 8.

The invention further provides for providing a process for preparing preferably linear polybutadienes, which have been modified in comb positions (pendantly) with polyether radicals having at least one ester group. Based on the European patent application EP 19212066.5 or PCT/EP2020/083013 the process should enable very simple access in terms of process technology to preferably linear polybutadienes having pendant polyether radicals, and be performable, for example, without use of organolithium compounds. The polyether-modified polybutadienes should at the same time also be obtainable by direct alkoxylation of pendantly hydroxy-functional polybutadienes. An additional problem addressed here was that of providing improved pendantly hydroxy-functional polybutadienes as precursors and chain starters for alkoxylation in the process.

Based on the teaching of the European patent application EP 19212066.5 or PCT/EP2020/083013, it has now been found that a process for preparing polyester-polyether-modified polybutadienes comprises the following steps:

a) reading at least one polybutadiene (A) with at least one epoxidizing reagent (B) to give at least one epoxy-functional polybutadiene (C);

b) reading the at least one epoxy-functional polybutadiene (C) with at least one hydroxy-functional compound (D) to give at least one hydroxy-functional polybutadiene (E);

c) reacting the at least one hydroxy-functional polybutadiene (E) with at least one epoxy-functional compound (F) to give at least one polyether-modified polybutadiene (G)

d) reacting the at least one polyether-modified polybutadiene (G) with at least one compound (1) to give at least one polyether-polyester-modified polybutadiene (H).

It has been found that, surprisingly, polybutadienes having a high proportion of 1,4 units and a low content of vinylic 1,2 units, after epoxidation with hydrogen peroxide, can readily be reacted under acid-catalysed ring-opening with OH-functional compounds to give pendantly OH-functional polybutadienes (polybutadienols) and can then be alkoxylated with alkylene oxides.

The subject matter of the present invention is expressed as described below. Advantageous configurations of the invention are specified in the examples and the description.

The subject matter of the invention is described by way of example below but without any intention that the invention be restricted to these illustrative embodiments. Where ranges, general formulae or classes of compounds are specified below, these are intended to encompass not only the corresponding ranges or groups of compounds that are explicitly mentioned but also all subranges and subgroups of compounds that can be obtained by removing individual values (ranges) or compounds. Where documents are cited in the context of the present description, the entire content thereof is intended to be part or the disclosure content of the present invention.

Where average values are stated hereinbelow, these values are numerical averages unless otherwise stated. Where measured values, parameters or material properties determined by measurement are stated hereinbelow, these are, unless otherwise stated, measured values, parameters or material properties measured at 25° C. and preferably at a pressure of 101 325 Pa (standard pressure).

Where numerical ranges in the form "X to Y" are stated hereinbelow, where X and Y represent the limits of the numerical range, this is synonymous with the statement "from at least X up to and including Y", unless otherwise stated. Stated ranges thus include the range limits X and Y, unless otherwise stated.

Wherever molecules/molecule fragments have one or more stereocentres or can be differentiated into isomers on account of symmetries or can be differentiated into isomers on account of other effects, for example restricted rotation, all possible isomers are included by the present invention.

The formulae detailed in this invention describe compounds or radicals that are constructed from repeat units, for example repeat fragments, blocks or monomer units, and can have a molar mass distribution. The frequency of the repeat units is stated in the form of indices. The indices used in the formulae should be regarded as statistical averages (numerical averages). The indices used and also the value ranges of the reported indices are regarded as averages of the possible statistical distribution of the structures that are actually present and/or mixtures thereof. The various fragments or repeat units of the compounds described in the formulae (1) to (5) below may be distributed statistically. Statistical distributions have a blockwise structure with any number of blocks and any sequence or are subject to a randomized distribution; they may also have an alternating structure or else form a gradient along the chain, where one is present; in particular they can also give rise to any mixed forms in which groups having different distributions may optionally follow one another. The formulae below include all permutations of repeat units. Thus, where compounds such as polybutadienes (A), epoxy-functional polybutadienes (C), hydroxy-functional polybutadienes (E), polyether-modified polybutadienes (G) or polyether-polyester-modified polybutadienes (H), for example, that can have multiple instances of different units are described in the context of the present invention, these may thus occur in these compounds either in an unordered manner, for example in statistical distribution, or in an ordered manner. The figures for the number or relative frequency of units in such compounds should be regarded as an average (numerical average) over all the corresponding compounds. Specific embodiments may lead to restrictions on statistical distributions as a result or the embodiment. For all regions unaffected by such restriction, the statistical distribution is unchanged.

The Invention thus further provides a process for preparing one or more polyester-polyether-modified polybutadienes, comprising the steps of:
- a) reacting at least one polybutadiene (A) with at least one epoxidizing reagent (B) to give at least one epoxy-functional polybutadiene (C);
- b) reacting the at least one epoxy-functional polybutadiene (C) with at least one hydroxy-functional compound (D) to give at least one hydroxy-functional polybutadiene (E);
- c) reacting the at least one hydroxy-functional polybutadiene (E) with at least one epoxy-functional compound (F) to give at least one polyether-modified polybutadiene (G),
- d) reacting the at least one polyether-modified polybutadiene (G) with at least one compound (1) to give at least one polyether-polyester-modified polybutadiene (H).

In step d), a catalyst may preferably serve as initiator of the anionic ring-opening polymerization. It is possible to use any common catalysts.

It is possible to use as catalysts preferably bases or acids, metal salts, metal alkoxides or metal compounds.

Metal alkoxides are, for example, zirconium butoxide, tetraisopropyl titanate, tetrabutyl titanate or titanium(IV) 2-ethylhexyloxide.

Metal salts are, for example, zinc acetate, potassium acetate, lithium acetate, sodium acetate, calcium acetate, barium acetate, magnesium acetate, copper acetate, cobalt acetate or zinc/bismuth carboxylate.

Acid catalysts are, for example, toluenesulfonic acid or trifluoroacetic acid.

It is also possible to use tin chloride, tin octoate, dibutyltin dilaurate or monobutyltin oxide.

It is preferable that the process according to the invention additionally includes at least one of the following optional steps:
- e) colour lightening of the at least one polyether-modified polybutadiene (G).

The process is preferably further characterized in that
- in step a) >0% to 70%, preferably 1% to 50%, more preferably 2% to 40%, even more preferably 3% to 30% and especially preferably 4% to 20% of the double bonds of the at least one polybutadiene (A) are epoxidized with the aid of performic acid, which is produced in situ from formic acid and $H_2O_2$;
- in step b) one or more short-chain alcohols having 1 to 6 carbon atoms, especially isobutanol, are added onto the epoxy groups or the at least one epoxy-functional polybutadiene (C) under ring opening, preferably using one or more acidic catalysts, especially trifluoromethanesulfonic acid;
- in step c) one or more epoxy-functional compounds (F) selected from alkylene oxides and optionally further epoxy-functional monomers are added onto the resultant pendant OH groups of the at least one hydroxy-functional polybutadiene (E) in an alkoxylation reaction, preferably additionally using a Zn/Co double metal cyanide catalyst or basic catalysts such as amines, guanidines, amidines, alkali metal hydroxides or alkali metal alkoxides;
- in step d) optionally the at least one polyether-modified polybutadiene (G) is reacted with at least one compound (1) selected from the group consisting of cyclic anhydrides, lactones or cyclic carbonates as monomers or comonomers to give at least one polyester-polyether-modified polybutadiene (H);
- in step e) optionally the colour lightening of the at least one polyether-modified polybutadiene (G) using activated carbon and/or hydrogen peroxide is carried out.

The process according to the invention makes it possible for the first time to modify linear polybutadienes by a simple direct alkoxylation on the pendant OH groups with polyether radicals in comb positions. The chain length and monomer sequence in the polyether radical may be varied within wide ranges. The average number of polyether radicals bonded to the polybutadiene is adjustable in a controlled manner via the degree of epoxidation and the hydroxy functionalization, and opens up a great structural variety in the hydroxy-functional polybutadienes (E).

The grafting of polyethers onto polybutadiene known in the prior art is rarely quantitative in practice, and the reaction products typically contain free proportions of polyethers and possibly unfunctionalized polybutadienes. The above-described addition of OH-functional polyethers via their OH groups onto epoxidized polybutadienes is likewise usually incomplete, and the products contain residual unconverted epoxy groups. If the polyethers are used in excess, it is possible to reduce the residual content of epoxy groups, but the excess polyethers remain in the product since they cannot be removed by distillation.

For compound (1) in step d) preference is given to using
- cyclic anhydrides, in pure form or in any desired mixtures, which are selected from the group consisting of saturated, unsaturated or aromatic cyclic dicarboxylic anhydrides, preferably succinic anhydride, oct(en)yl-, dec(en)yl- and dodec(en)ylsuccinic anhydride, maleic anhydride, itaconic anhydride, glutaric anhydride, adipic anhydride, citraconic anhydride, trimellitic anhydride, phthalic anhydride, hexahydro-, tetrahydro-, dihydro-, methylhexahydro- and methyltetrahydrophthalic anhydride or
- lactones, in pure form or in any desired mixtures, which are selected from the group consisting of valerolactones, caprolactones and butyrolactones, which may be unsubstituted or substituted by alkyl groups, preferably methyl groups, preferably ε-caprolactone or δ-valerolactone.

In step d), a catalyst may preferably serve as initiator of the anionic ring-opening polymerization. It is possible to use bases or acids, metal sails, metal alkoxides or metal compounds as catalysts.

Metal alkoxides are, for example, zirconium butoxide, tetraisopropyl titanate, tetrabutyl titanate or titanium(IV) 2-ethylhexyloxide.

Metal salts are, for example, zinc acetate, potassium acetate, lithium acetate, sodium acetate, calcium acetate, barium acetate, magnesium acetate, copper acetate, cobalt acetate or zinc/bismuth carboxylate.

Acid catalysts are, for example, toluenesulfonic acid or trifluoroacetic acid.

It is also possible to use tin chloride, tin octoate, dibutyltin dilaurate or monobutyltin oxide.

The polybutadienes having polyester-polyether radicals in comb positions that are obtainable in accordance with the invention are preferably essentially free of residual epoxy groups. The process product according to the invention preferably contains essentially no free polyether components. Preferably, essentially all polyethers are chemically attached to the polybutadiene via an ether bond. The process products according to the invention are thus distinctly different from the compounds known today from the prior art by virtue of their elevated purity.

For the composition according to the invention, the compound was preferably prepared based on linear polybutadienes.

For the composition according to the invention, the compound preferably has no pendant (in comb position) polybutadienes.

The compound preferably has exclusively pendant (in comb position) repeat units (U), (V) and/or (W).

The Preferred Configuration of Step a) of the Process According to the Invention:

In step a) of the process according to the invention, at least one polybutadiene (A) is reacted with at least one epoxidizing reagent (B) to give at least one epoxy-functional polybutadiene (C).

In this reaction double bonds of the polybutadiene (A) are converted to epoxy groups. Various methods of epoxidizing polybutadienes, for example with percarboxylic acids and hydrogen peroxide, are known to the person skilled in the art and are disclosed, for example, in CN 101538338, JP 2004346310, DD 253827 and WO 2016/142249 A1. Performic acid is particularly suitable for preparation of the epoxy-functional polybutadienes (C) having a high proportion of 1,4 units, and can also be formed in situ from formic acid in the presence of hydrogen peroxide. The epoxidation preferably takes place in a solvent such as toluene or chloroform, which is removed by distillation after the reaction and after the washing-out of any peroxide residues.

The polybutadienes (A) are polymers of buta-1,3-diene. The polymerization of the buta-1,3-diene monomers is effected essentially with 1,4 and/or 1,2 linkage. 1,4 linkage leads to what are called 1,4-trans units and/or 1,4-cis units, which are also referred to collectively as 1,4 units. 1,2 linkage leads to what are called 1,2 units. The 1,2 units bear a vinyl group and are also referred to as vinylic 1,2 units. In the context of the present invention, the 1,2 units are also referred to as "(X)", the 1,4-trans units as "(Y)", and the 1,4-cis units as "(Z)":

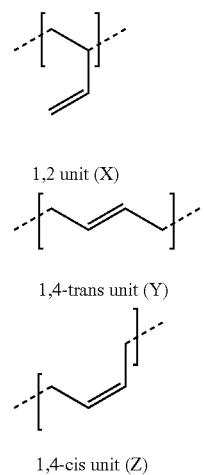

1,2 unit (X)

1,4-trans unit (Y)

1,4-cis unit (Z)

The double bonds present in the units are referred to analogously as 1,4-trans double bonds, 1,4-cis double bonds, or as 1.2 double bonds or 1.2 vinyl double bonds. The 1,4-trans double bonds and 1,4-cis double bonds are also referred to collectively as 1,4 double bonds.

The polybutadienes (A) are thus unmodified polybutadienes. The polybutadienes (A) and their preparation processes are known to the person skilled in the art. Preparation is preferably effected by means of a free-radical, anionic or coordinative chain polymerization.

Free-radical chain polymerization is preferably conducted as an emulsion polymerization. This leads to statistical occurrence of the three units mentioned. In the case of a low reaction temperature (about 5° C.), there is a fall in the proportion of vinyl groups. Initiation is preferably effected with potassium peroxodisulfate and iron salts, or else with hydrogen peroxide.

In anionic chain polymerization, the chain polymerization is preferably initiated with butyllithium. The polybutadiene (A) thus obtained contains about 40% 1,4-ds units and 50% 1,4-trans units.

In the case of coordinative chain polymerization, preference is given to using Ziegler-Natta catalysts, especially stereospecific Ziegler-Natta catalysts, that lead to a polybutadiene (A) having a high proportion of 1,4-cis units.

The polymerization of 1,3-butadiene, due to side reactions or further reactions, for example a further reaction of the double bonds of the resulting 1.2 and 1,4 units of the polybutadiene, may also result in branched polybutadienes (A). However, the polybutadienes (A) used in accordance with the invention are preferably linear, i.e. unbranched, polybutadienes. It is also possible that the polybutadienes include small proportions of units other than 1,2 units, 1,4-trans units or 1,4-cis units. However, it is preferable that the proportion by mass of the sum total of 1,2 units, 1,4-trans units and 1,4-cis units is at least 80%, preferably at least 90%, especially at least 99%, based on the total mass of the at least one polybutadiene (A), i.e. based on the total mass of all polybutadienes (A) used.

For the process according to the invention, preference is given to using those polybutadienes (A) that have 0% to 80% 1,2 units and 20% to 100% 1,4 units, preferably 0% to 30% 1,2 units and 70% to 100% 1,4 units, particularly preferably 0% to 10% 1,2 units and 90% to 100% 1.4 units, and especially preferably 0% to 5% 1,2 units and 95% to 100% 1,4 units, based on the sum total of 1.2 units and 1,4 units.

It is therefore preferable that, of the double bonds of all the polybutadienes (A) used, 0% to 80% are 1,2 vinyl double bonds and 20% to 100% are 1,4 double bonds, preferably 0% to 30% are 1,2 vinyl double bonds and 70% to 100% are 1,4 double bonds, particularly preferably 0% to 10% are 1,2 vinyl double bonds and 90% to 100% are 1,4 double bonds, especially preferably 0% to 5% are 1,2 vinyl double bonds and 95% to 100% are 1,4 double bonds.

For the inventive preparation of the products, accordingly, preference is given to using polybutadienes (A) of the formula (1)

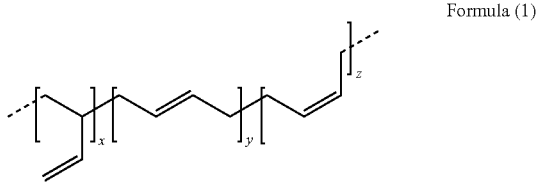

Formula (1)

having a content of 0% to 80% 1.2 vinyl double bonds (index x) and 20% to 100% 1,4 double bonds (sum of the indices y and z), preferably 0% to 30% 1,2 vinyl double bonds and 70% to 100% 1,4 double bonds, particularly preferably having 0% to 10% 1,2 vinyl double bonds and 90% to 100% 1,4 double bonds, especially preferably having 0% to 5% 1,2 vinyl double bonds and 95% to 100% 1,4 double bonds. The ratio of 1,4-trans double bonds (index y) and 1,4-cis double bonds (index z) is freely variable.

The indices x, y and z give the number of the respective butadiene unit in the polybutadiene (A). The indices are numerical averages (number averages) over the entirety of all polybutadiene polymers of the at least one polybutadiene (A).

The average molar mass and polydispersity of the polybutadienes (A) of formula (1) used is freely variable.

It is preferable that the number-average molar mass $M_n$ of the at least one polybutadiene (A) is from 200 g/mol to 20 000 g/mol, preferably from 500 g/mol to 10 000 g/mol, more preferably from 700 g/mol to 5000 g/mol.

Alternatively, it is preferable that the number-average molar mass $M_n$ of the at least one polybutadiene (A) is from 2100 g/mol to 20 000 g/mol, more preferably from 2200 g/mol to 10 000 g/mol, most preferably from 2300 g/mol to 5000 g/mol.

In the context of the present invention, number-average molar mass $M_n$, weight-average molar mass $M_w$ and polydispersity ($M_w/M_n$) are preferably determined by means of gel permeation chromatography (EPC) as described in the examples.

It is further preferable that the at least one polybutadiene (A) has a numerical average of 5 to 380, preferably 10 to 180, most preferably 15 to 90, units selected from the group consisting of 1,2 units, 1,4-cis units and 1,4-trans units.

Alternatively, it is further preferable that the at least one polybutadiene (A) has a numerical average of 35 to 360, preferably 40 to 180, most preferably 45 to 90, units selected from the group consisting or 1,2 units, 1,4-cis units and 1,4-trans units.

It is further preferable that the viscosity of the polybutadienes (A) used is 50 to 50 000 mPas, preferably 100 to 10 000 mPas, especially 500 to 5000 mPas (determined to DIN EN ISO 3219:1994-10).

Polybutadienes used with particular preference are the commercially available Polyvest® 110 and Polyvest® 130 products from Evonik Industries AG/Evonik Operations GmbH, having the following typical indices:

Polyvest® 110: ca. 1% 1.2 vinyl double bonds, ca. 24% 1,4-trans double bonds, ca. 75% 1,4-cis double bonds, number-average molar mass $M_n$ ca. 2600 g/mol, viscosity (20° C.) 700-880 mPas (to DIN EN ISO 3219:1994-10), Polyvest® 130: ca. 1% 1.2 vinyl double bonds, ca. 22% 1,4-trans double bonds, ca. 77% 1,4-cis double bonds, number-average molar mass $M_n$ ca. 4600 g/mol, viscosity (20° C.) 2700-3300 mPas (to DIN EN ISO 3219:1994-10).

Polybutadienes used with particular preference are also the Lithene ultra AL and Lithene ActiV 50 products available from Synthomer PLC, having the following typical indices:

Lithene ultra AL: ca. 40% 1.2 vinyl double bonds, ca. 60% 1,4 double bonds,

Lithene ActiV 50: ca. 70% 1,2 vinyl double bonds, ca. 30% 1,4 double bonds,

The degree of epoxidation is determined quantitatively, for example, with the aid of $^{13}C$ NMR spectroscopy or epoxy value titration (determinations of the epoxy equivalent according to DIN EN ISO 3001:1999), and can be adjusted in a controlled and reproducible manner via the process conditions, especially via the amount of hydrogen peroxide used in relation to the amount of double bonds in the initial charge of polybutadiene.

It is preferable that, in step a) of the process according to the invention, >0% to 70%, preferably 1% to 50%, more preferably 2% to 40%, even more preferably 3% to 30% and especially preferably 4% to 20% of all double bonds of the at least one polybutadiene (A) are epoxidized.

Usable epoxidizing reagents (B) are in principle all epoxidizing agents known to the person skilled in the art. It is preferable that the epoxidizing reagent (B) is selected from the group of the peroxycarboxylic acids (percarboxylic acids, peracids), preferably from the group consisting of meta-chloroperbenzoic acid, peroxyacetic acid (peracetic acid) and peroxyformic acid (performic acid), especially peroxyformic acid (performic acid). The peroxycarboxylic acids are preferably formed in situ from the corresponding carboxylic acid and hydrogen peroxide.

It is particularly preferable that the at least one epoxidizing reagent (B) comprises performic acid, which is preferably formed in situ from formic acid and hydrogen peroxide.

The epoxidation of the at least one polybutadiene (A) takes place preferentially at the 1,4 double bonds in a statistical distribution over the polybutadiene chain. Epoxidation of the 1,2 double bonds can likewise take place, and likewise takes place in statistical distribution over the polybutadiene chain at these bonds. However, epoxidation of the 1,2 double bonds is less favoured compared to epoxidation of the 1,4 double bonds. The reaction product thus contains epoxy-functional polybutadiene polymers that differ from one another in their degree of epoxidation. All the degrees of epoxidation stated should therefore be regarded as averages.

It is further preferable, during the process according to the invention, to stabilize the reactants, intermediates and products using stabilizers or antioxidants in order to avoid unwanted polymerization reactions of the double bonds. Suitable for this purpose are e.g. the sterically hindered phenols known to those skilled in the art that are commercially available for example as Anox® 20, Irganox® 1010 (BASF), Irganox®1076 (BASF) and Irganox® 1135 (BASF). It is further preferable to conduct the overall preparation process under an inert atmosphere, for example under nitrogen. The unmodified reactants, i.e. the at least one polybutadiene (A) and also the polyether-modified finished products according to the invention, i.e. the at least one polyether-modified polybutadiene (G) or (K), should also preferably be stored as far as possible with exclusion of air.

The Preferred Configuration of Step b) of the Process According to the Invention:

In step b) of the process according to the invention, the at least one epoxy-functional polybutadiene (C) is reacted with at least one hydroxy-functional compound (D) to give at least one hydroxy-functional polybutadiene (E).

An addition (addition reaction) of the at least one hydroxy-functional compound (D) onto the at least one epoxy-functional polybutadiene (C) takes place in this reaction. Therefore, this reaction takes place forming one or more covalent bonds between the at least one hydroxy-functional compound (D) and the at least one epoxy-functional polybutadiene (C). The reaction preferably comprises (at least idealized) a reaction step in which a nucleophilic attack takes place of at least one hydroxyl group of the at least one hydroxy-functional compound (D) on at least one epoxy group of the at least one epoxy-functional polybutadiene (C) with ring-opening of this at least one epoxy group.

In principle, in the context of the process according to the invention, all compounds having at least one hydroxyl group can be added onto the epoxy groups of the polybutadiene. Hydroxy-functional compounds (D) may be selected, for example, from the group consisting of alcohols, carboxylic acids and water. Preference is given to selecting the at least one hydroxy-functional compound (D) from the group of the monofunctional alcohols having 1 to 6 carbon atoms, preferably from the group of the monofunctional alcohols having 2 to 4 carbon atoms, more preferably from the group consisting of ethanol, 1-propanol, isopropanol, 1-butanol, 2-butanol and isobutanol. It is also possible here to use any desired mixtures of these alcohols. However, it is particularly preferred that methanol is not used as the hydroxy-functional compound (D). Another suitable hydroxy-functional compound (D) is water. Water may be used alone or in a mixture with one or more other hydroxy-functional compounds (D). For example, it is possible to use mixtures of alcohol and water or mixtures of carboxylic acid and water in step b), it is thus unnecessary to dry the at least one hydroxy-functional compound (D), for example alcohol or carboxylic acid, and to free it of water.

The molar ratio of the OH groups of the hydroxy-functional compound (D) to the epoxy groups or the epoxy-functional polybutadiene (C) may be varied within a wide range. However, it is preferable to use the hydroxy-functional compounds (D) in a stoichiometric excess based on the stoichiometric ratio of hydroxyl groups to the epoxy groups of the epoxy-functional polybutadiene (C), in order to achieve quantitative conversion of all epoxy groups. It is therefore preferable that, in step b), the total number of hydroxyl groups in all the hydroxy-functional compounds (D) to the total number of epoxy groups in all the epoxy-functional polybutadienes (C) is from >1:1 to 50:1, further preferably from 2:1 to 35:1, even further preferably 3:1 to 30:1, especially preferably from 3:1 to 25:1. The excess of compound (D) may be removed, for example by distillation, after the reaction and be reused if required.

In a preferred embodiment, the reaction takes place in the presence of at least one acidic catalyst. The catalyst is either homogeneously soluble in the reaction mixture or distributed heterogeneously in solid form therein, for example sulfonic acid ion exchangers. In the context of the invention, preference is given to catalysts such as sulfuric acid, sulfonic acids and trifluoroacetic acid, more preferably trifluoromethanesulfonic acid. It is thus preferable that, in step b), an acid, further preferably sulfuric acid, sulfonic acids and/or trifluoroacetic acid, especially preferably trifluoromethanesulfonic acid, is used as catalyst.

The type of acid and the amount used are chosen so as to achieve very rapid and quantitative addition of the at least one hydroxy-functional compound (D) onto the epoxy groups of the at least one epoxy-functional polybutadiene (C). Preference is given to using trifluoromethanesulfonic acid at a concentration of 1 ppmw to 1000 ppmw (ppmw=ppm by mass), more preferably at a concentration of 50 ppmw to 3000 ppmw, based on the reaction mixture.

The reaction of the at least one epoxy-functional polybutadiene (C) with the at least one hydroxy-functional compound (D) in the presence of an acidic catalyst preferably takes place within the temperature range from 20° C. to 120° C., and is limited at the upper end by the boiling point of the hydroxy-functional compound (D) or, when multiple hydroxy-functional compounds (D) are used, by the boiling point or the most volatile hydroxy-functional compound (D). Preference is given to conducting the reaction at 50° C. to 90° C. The components are stirred for a few hours until the epoxy groups have been converted as fully as possible. The analysis for epoxy groups can be effected either by NMR spectroscopy analysis or by known methods of epoxy value titration (as described in the examples). The reaction conditions in step b) are preferably chosen such that more than 97% of the epoxy groups generated in step a) are converted under ring-opening. It is especially preferable that no epoxy groups are detectable any longer in the product from step b), i.e. In the at least one hydroxy-functional polybutadiene (E).

After the reaction, the acidic reaction mixture is neutralized. For this purpose, it is possible in principle to add any basic neutralizing agent. The neutralization is preferably carried out using sodium hydrogencarbonate in solid form or as an aqueous solution. The possible excess hydroxy-functional compounds (D) and optionally water are preferably removed by distillation and precipitated salts are filtered off as required. Preference is given to using aqueous sodium hydrogencarbonate solution in this case, since lighter coloured products are obtained.

Each epoxy group in an epoxy-functional polybutadiene (C), after ring opening by a hydroxy-functional compound (D) of the formula A-OH, results in a repeat unit of the formula (2a), (2b) or (2c):

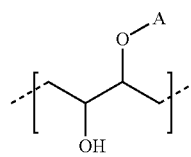

Formula (2a)

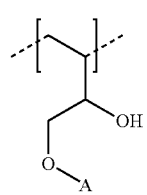

Formula (2b)

-continued

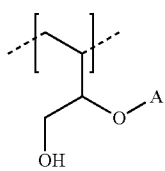

Formula (2c)

A here is preferably a monovalent organic radical that may also bear further hydroxyl groups, or a hydrogen radical. If, for example, a monofunctional aliphatic alcohol having 1 to 6 carbon atoms is used as hydroxy-functional compound (D), A is an alkyl radical having 1 to 6 carbon atoms. In the case of water as hydroxy-functional compound (D). A is a hydrogen radical, i.e. A=H. If, for example, a carboxylic acid is used as hydroxy-functional compound (D). A is an acyl radical. Each epoxy group converted thus results in at least one pendant OH group. If, as in the case of water, A=H, each epoxy group converted results in exactly two pendant OH groups. In all other cases. i.e. A≠H, each epoxy group converted results in exactly one pendant OH group.

In the case of the polybutadienes (A) having a predominant proportion of 1,4 units that are preferred in accordance with the invention, those of the formula (2a) are predominant among the repeat units of the formulae (2a), (2b) and (2c).

It is preferable that the at least one hydroxy-functional polybutadiene (E) has 20% to 100%, preferably 70% to 100%, more preferably 90% to 100%, especially preferably 95% to 100% repeat units of the formula (2a), based on the sum total of repeat units of the formulae (2a), (2b) and (2c).

It is further preferable that the proportion of the repeat units of the formulae (2a), (2b) and (2c) together is >0% to 70%, preferably 1% to 50%, further preferably 2% to 40%, even further preferably 3% to 30% and especially preferably 4% to 20%, based on the total number of all repeat units of the at least one hydroxy-functional polybutadiene (E). It is correspondingly preferable that the degree of hydroxylation is >0% to 70%, preferably 1% to 50%, further preferably 2% to 40%, even further preferably 3% to 30% and especially preferably 4% to 20%. On completion of conversion in step b), the degree of hydroxylation of the hydroxy-functional polybutadiene (E) corresponds to the degree of epoxidation of the corresponding epoxy-functional polybutadiene (C).

The Preferred Configuration of Step c) of the Process According to the Invention:

In step c) of the process according to the invention, the at least one hydroxy-functional polybutadiene (E) is reacted with at least one epoxy-functional compound (F) to give at least one polyether-modified polybutadiene (G).

The at least one hydroxy-functional polybutadiene (E) from step b) serves, in step c), as starter compound for the reaction with the at least one epoxy-functional compound (F). Under ring opening and preferably in the presence of a suitable catalyst, the at least one epoxy-functional compound (F) (also referred to hereinafter simply as "monomer" or "epoxy monomer" or "epoxide") is added onto the OH groups of the at least one hydroxy-functional polybutadiene (E) in a polyaddition reaction. This leads to the formation of the polybutadienes according to the invention with polyether chains in comb (pendant) positions, i.e. to the formation of the at least one polyether-modified polybutadiene (G). The polyether-modified polybutadiene (G) is preferably a linear polybutadiene which has been modified with polyether radicals in comb (pendant) positions. It is thus preferable that the polyether-modified polybutadiene (G) has a linear polybutadiene backbone and pendant polyether radicals.

The reaction in step c) is preferably an alkoxylation reaction, i.e. a polyaddition of alkylene oxides onto the at least one hydroxy-functional polybutadiene (E). However, the reaction in step c) may also be conducted with glycidyl compounds alternatively or additionally to the alkylene oxides.

It is therefore preferable that the at least one epoxy-functional compound used in step c) is selected from the group of the alkylene oxides, preferably from the group of the alkylene oxides having 2 to 18 carbon atoms, further preferably from the group of the alkylene oxide having 2 to 8 carbon atoms, especially preferably from the group consisting of ethylene oxide, propylene oxide, 1-butylene oxide, ds-2-butylene oxide, trans-2-butylene oxide, isobutylene oxide and styrene oxide; and/or that the at least one epoxy-functional compound used in step c) is selected from the group of the glycidyl compounds, preferably from the group of the monofunctional glycidyl compounds, more preferably from the group consisting of phenyl glycidyl ether, o-cresyl glycidyl ether, tert-butylphenyl glycidyl ether, allyl glycidyl ether, butyl glycidyl ether, 2-ethylhexyl glycidyl ether, $C_{12}/C_{14}$ fatty alcohol glycidyl ether and $C_{13}/C_{15}$ fatty alcohol glycidyl ether.

The monomers may be added either individually in pure form, in alternating succession in any metering sequence, or else simultaneously in mixed form. The sequence of monomer units in the resulting polyether chain is thus subject to a blockwise distribution or a statistical distribution or a gradient distribution in the end product.

By the process according to the invention, pendant polyether chains are constructed on the polybutadiene, which are exemplified in that they can be prepared in a controlled and reproducible manner in terms of structure and molar mass.

The sequence of monomer units can be varied by the sequence of addition within broad limits.

The molar masses of the pendant polyether radicals may be varied within broad limits by the process according to the invention, and controlled specifically and reproducibly via the molar ratio of the added monomers in relation to the OH groups of the at least one initially charged hydroxy-functional polybutadiene (E) from step b).

The polyether-modified polybutadienes (G) prepared in accordance with the invention are preferably characterized in that they contain B radicals bonded to the polybutadiene skeleton via an ether group according to the formulae (3a), (3b) and (3c)

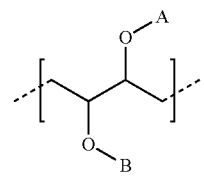

Formula (3a)

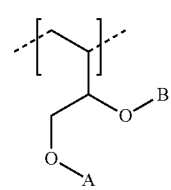

Formula (3b)

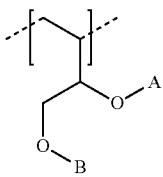

Formula (3c)

As set out above for step b), the A radical in the formulae (3a), (3b) and (3c) comes from the compound A-OH. i.e, the hydroxy-functional compound (D) used in step b). As has also been stated above, two cases are to be distinguished in step b), namely A≠H or A=H. In the first case. i.e. A≠H, the radical A in the formulae (3a), (3b) and (3c) is identical to the radical A in the formulae (2a), (2b) and (2c). In the second case, i.e. A=H, the radical A in the formulae (3a), (3b) and (3c) is in each case independently H or a radical B. If, for example, a monofunctional aliphatic alcohol having 1 to 6 carbon atoms is used as hydroxy-functional compound (D), A is an alkyl radical having 1 to 6 carbon atoms. If, for example, a carboxylic acid is used as hydroxy-functional compound (D), A is an acyl radical. If, however, water is used as hydroxy-functional compound (D), A in the formulae (3a), (3b) and (3c) is a B radical in the case of reaction with one or more epoxy-functional compounds (F); A remains hydrogen in the case that there is no reaction. Therefore, each pendant hydroxyl group converted results in exactly one pendant —O—B radical. The radical B is in turn composed or one or more monomers, preferably of two or more monomers, of the at least one epoxy-functional compound (F) used. In the context or the invention, it is possible in principle to use all alkoxylation catalysts known to the person skilled in the art, for example basic catalysts such as alkali metal hydroxides, alkali metal alkoxides, amines, guanidines, amidines, phosphorus compounds such as triphenylphosphine, and additionally acidic and Lewis-acidic catalysts such as $SnCl_4$, $SnCl_2$, $SnF_2$, $BF_3$ and $BF_3$ complexes, and also double metal cyanide (DMC) catalysts.

Prior to the feeding of epoxide, i.e. prior to the addition of the at least one epoxy-functional compound (F) used, the reactor partly filled with the starter and catalyst is inertized, for example with nitrogen. This is accomplished, for example, by repeated alternating evacuation and supply of nitrogen. It is advantageous to evacuate the reactor to below 200 mbar after the last injection of nitrogen. This means that the addition of the first amount of epoxy monomer preferably takes place into the evacuated reactor. The monomers are dosed while stirring and optionally cooling in order to remove the heat of reaction released and to maintain the preselected reaction temperature. The starter used is the at least one hydroxy-functional polybutadiene (E), or else it is possible to use a polyether-modified polybutadiene (G) already prepared by the process of the invention as starter, as described further down.

DMC Catalysis

Preference is given to using zinc/cobalt DMC catalysts, in particular those containing zinc hexacyanocobaltate(III). Preference is given to using the DMC catalysts described in U.S. Pat. No. 5,158,922, US 20030119663, WO 01/80994. The catalysts may be amorphous or crystalline.

It is preferable that the catalyst concentration is preferably >0 ppmw to 1000 ppmw, preferably >0 ppmw to 700 ppmw, more preferably 10 ppmw to 500 ppmw, based on the total mass of the products formed.

The catalyst is preferably metered into the reactor only once. The catalyst should preferably be clean, dry and free of basic impurities that could inhibit the DMC catalyst. The amount of catalyst should preferably be set so as to give sufficient catalytic activity for the process. The catalyst may be metered in in solid form or in the form of a catalyst suspension. If a suspension is used, the OH-functional starter is especially suitable as suspension agent.

In order to start the DMC-catalysed reaction, it may be advantageous first to activate the catalyst with a portion of the at least one epoxy-functional compound (F), preferably selected from the group of the alkylene oxides, especially with propylene oxide and/or ethylene oxide. Once the alkoxylation reaction is underway, the continuous addition of the monomer may be commenced.

The reaction temperature in the case of a DMC-catalysed reaction in step c) is preferably 60° C. to 200° C., further preferably 90° C. to 160° C., more preferably 100° C. to 140° C.

The internal reactor pressure in the case of a DMC-catalysed reaction in step c) is preferably 0.02 bar to 100 bar, further preferably 0.05 bar to 20 bar, more preferably 0.1 bar to 10 bar (absolute).

More preferably, a DMC-catalysed reaction in step c) is conducted at a temperature of 100° C. to 140° C. and a pressure of from 0.1 bar to 10 bar.

The reaction may be carried out in a suitable solvent, for example in order to lower the viscosity. At the end of the epoxide addition, there preferably follows a period of further reaction to allow the reaction to proceed to completion. The further reaction may for example be conducted by continued reaction under the reaction conditions (i.e. with maintenance of e.g. the temperature) without addition of reactants. The DMC catalyst typically remains in the reaction mixture.

Once the reaction has taken place, unreacted epoxides and any other volatile constituents can be removed by vacuum distillation, steam- or gas-stripping, or other methods of deodorization. The finished product is finally filtered at <100° C. in order to remove any cloudy substances.

Base Catalysis

As well as the DMC catalysts, it is also possible in accordance with the invention to use basic catalysts in step c). Especially suitable are alkali metal alkoxides such as sodium methoxide and potassium methoxide, which are added in solid form or in the form of their methanolic solutions. In addition, it is possible to use all alkali metal hydroxides, especially sodium hydroxide and potassium hydroxide, either in solid form or In the form of aqueous or alcoholic solutions, for example. In addition, it is also possible in accordance with the invention to use basic nitrogen compounds, preferably amines, guanidines and amidines, more preferably tertiary amines such as trimethylamine and triethylamine.

It is preferable to use the basic catalysts in a concentration of >0 mol % to 100 mol %, preferably >0 mol % to 50 mol %, more preferably 3 mol % to 40 mol %, based on the amount of OH groups in the starter.

The reaction temperature in the case of a base-catalysed reaction in step c) is preferably 80° C. to 200° C., further preferably 90° C. to 160° C., more preferably 100° C. to 160° C.

The internal reactor pressure in the case of a base-catalysed reaction in step c) is preferably 0.2 bar to 100 bar, further preferably 0.5 bar to 20 bar, more preferably 1 bar to 10 bar (absolute).

More preferably, the base-catalysed reaction in step c) is conducted at a temperature of 100° C. to 160° C. and a pressure of from 1 bar to 10 bar.

The reaction may optionally be performed in a suitable solvent. At the end of the epoxide addition, there preferably follows a period of further reaction to allow the reaction to proceed to completion. The further reaction can be conducted, for example, by continued reaction under reaction conditions without addition of reactants. Once the reaction has taken place, unreacted epoxides and any other volatile constituents can be removed by vacuum distillation, steam- or gas-stripping, or other methods of deodorization. Volatile catalysts such as amines are removed here.

For neutralization of the basic crude products, acids such as phosphoric acid or sulfuric acid or carboxylic acids such as acetic acid and lactic acid are added. Preference is given to the use of aqueous phosphoric acid and lactic acid. The amount of the respective acid used is guided by the amount of basic catalyst used beforehand. The basic polybutadiene with pendant polyether radicals is stirred in the presence of the acid at preferably 40° C. to 95° C. and then distilled to dryness in a vacuum distillation at <100 mbar and 80° C. to 130° C. The neutralized product is finally filtered, preferably at <100° C., in order to remove precipitated salts.

It is preferable that the end products according to the invention have a water content of <0.2% (specified as proportion by mass based on the total mass of the end product) and an acid number of <0.5 mg KOH/g and are virtually phosphate-free.

Products as Starters

It is not always possible to achieve the desired molar mass of the end product in just a single reaction step, especially the alkoxylation step. Particularly when long polyether side chains are the aim and/or the starter from step b) has a high OH-functionality, it is necessary to add large amounts of epoxy monomers. This is sometimes not permitted by the reactor geometry. The polyether-modified polybutadienes (G) prepared in accordance with the invention from step c) bear an OH group at the ends of each of their pendant polyether radicals, and are therefore suitable in turn as starter for construction of conversion products of higher molecular weight. In the context of the invention, they are precursors and starter compounds for the synthesis of polybutadienes having relatively long polyether radicals. The at least one epoxy-functional compound (F) can thus be converted in step c) in multiple component steps.

A product prepared with the aid of DMC catalysis in step c) may, in accordance with the invention, have its level of alkoxylation increased by new addition of epoxy monomers, either by means of DMC catalysis or with use of one of the aforementioned basic or acidic catalysts, it is optionally possible to add a further DMC catalyst in order, for example, to increase the reaction rate in the chain extension.

A product prepared under base catalysis from step c) may similarly be alkoxylated to higher molar masses either under basic or acidic conditions or by means of DMC catalysis. In step c), neutralization is advantageously dispensed with if the aim is to react the basic precursor further with monomers under base catalysis. It is optionally possible to add a further basic catalyst in order, for example, to increase the reaction rate in the chain extension.

The Preferred Configuration of Step d) of the Process According to the Invention:

In a further step d), the at least one polyether-modified polybutadiene (G) is reacted with at least one compound (I) to give at least one polyester-polyether-modified polybutadiene (H).

In this case, the B radicals of the polyether-modified polybutadiene (G) having terminal hydroxyl groups are further reacted to give terminal ester groups. Used here are dilactides or cyclic anhydrides, in pure form or in any desired mixtures, which are selected from the group consisting of saturated, unsaturated or aromatic cyclic dicarboxylic anhydrides, preferably succinic anhydride, oct(en)yl-, dec(en)yl- and dodec(en)ylsuccinic anhydride, maleic anhydride, itaconic anhydride, glutaric anhydride, adipic anhydride, citraconic anhydride, trimellitic anhydride, phthalic anhydride, hexahydro-, tetrahydro-, dihydro-, methylhexahydro- and methyltetrahydrophthalic anhydride and/or lactones, in pure form or in any desired mixtures, which are selected from the group consisting of valerolactones, caprolactones and butyrolactones, which may be unsubstituted or substituted by organic radicals, preferably methyl groups, preferably ε-caprolactone or δ-valerolactone.

As cyclic carbonates, it is generally possible to use all cyclic carbonates known to those skilled in the art, accessible via insertion of $CO_2$ into epoxides, in pure form or in any desired mixtures. Carbonates derived from glycidyl ethers are preferably used, particular preference being given to propylene carbonate and ethylene carbonate.

The monomers may be added either individually in pure form, in alternating succession in any metering sequence, or else simultaneously in mixed form. The sequence of monomer units in the resulting polyester chain is thus subject to a blockwise distribution or a statistical distribution or a gradient distribution in the end product.

Optional Step e)

In an optional step e), the at least one polyether-modified polybutadiene (G) is lightened in colour.

If the optional step e) follows step d), the at least one polyester-polyether-modified polybutadiene (H) is lightened in colour. However, the lightening may also be carried out after step c) of the process according to the invention and the at least one polyether-modified polybutadiene (G) is lightened in colour. The colour lightening can be effected, for example, by adding activated carbon, preferably in a suitable solvent, or by treatment with hydrogen peroxide. The colour lightening can be determined preferably via the Gardner colour number (determined in accordance with DIN EN ISO 4630). It is preferred here that the Gardner colour number of the polyether-modified polybutadiene (G) is reduced in terms of the colour lightening by at least 1, preferably by at least 2. Particular preference is given to polyether-modified polybutadienes (G) having a Gardner colour number of at most 3, especially of at most 2.5.

Reactors

Reactors used for the process according to the invention may in principle be any suitable reactor types that allow control over the reaction and any exothermicity therein. The reaction regime may be executed continuously, semicontinuously or else batchwise, in a manner known in process technology, and can be flexibly tailored to the production equipment available. Besides conventional stirred-tank reactors, it is also possible to use jet-loop reactors with a gas phase and internal heat exchanger tubes as described in WO 01/062826. It is also possible to use loop reactors having no gas phase.

The invention further provides a composition comprising a compound according to the invention having at least one repeat unit (U)*, (V)* and/or (W)*.

Preference is given to using the composition according to the invention for producing coating materials, paints and lacquers, as printing ink or inkjet ink or else sealants and adhesives.

The invention also provides for the use of the compound according to the invention having at least one repeat unit (U)*, (V)* and/or (W)* as adhesion promoter, defoamer, dispersing additive, wetting aid, hydrophobizing additive, rheology additive, glide additive, plasticizing additive or other additives for the lacquer and paint sector.

The compounds according to the invention may preferably be used in 1K (one-component) coating systems or 2K (two-component) coating systems, in melamine baking systems, room or high-temperature systems, UV systems. These are verified after addition of the substances according to the invention with respect to the adhesion-improving properties on diverse substrates.

The substrate is preferably metal, concrete, wood and/or a composite material such as glass fibre and/or carbon fibre composite, steel (variously alloyed and/or post-treated), aluminium, mineral substrates such as glass, dimensionally stable plastics and/or duromers.

The term "metallic substrates" is understood to mean, albeit non-exhaustively, the following materials: hot and cold rolled steel, with or without post-treatment. Steels that are not post-treated are degreased prior to use by means of specific cleaners, for example, from GARDOBOND®.

As first layer, a chemical solution may be applied, for example Type 26 from GARDOBOND®. This can be either sprayed (S) or dipped (D). The post-treatment may typically be carried out using an inorganic conversion layer based on phosphation, alkaline passivation or chromation. This may be carried out by hot dip galvanization or else electrolytic galvanization. For example, an aqueous zinc phosphate solution may be used. This forms a layer of tertiary zinc phosphate or zinc-iron phosphate.

However, phosphation may also be carried out. For example, an aqueous solution with primary alkali metal phosphates is used. These sheet metals may be obtained, for example, from Q-LAB® as Type R-I.

Subsequently, to ensure a sealed protective layer on the metal, a further chemical rinse solution for passivation is used. Typically used is, firstly, demineralized water or else diverse rinse solutions, for example Gardolene® D60, D86 or D6800.

Aluminium is usually used cold-rolled, corresponding to the grade AlMg 1 G 18, for example type AA 5005A from GARDOBOND® or the grade AlMg0.4Si1.2 (automobile specification) type AA6016 from GARDOBOND®. Here, the surface is treated with an aqueous chromating solution comprising chromic acid. These sheet metals are, inter alia, obtainable from Q-LAB® as type AL. However, galvanized steel may also be further treated using this method.

The term "glass" is understood to mean inorganic silicate glass, for example borosilicate glass or soda-lime glass, which serve, for example, as beverage bottles. These are typically provided with labels or else recently also subjected to direct printing.

The term "dimensionally stable plastics" is understood to mean, albeit non-exhaustively, the following polymers: acrylonitrile-butadiene-styrene (ABS), polyamides (PA), polymethylmethacrylate (PMMA), polycarbonate (PC), polyethylene terephthalate (PET), polyethylene (PE), polypropylene (PP), polystyrene (PS), polyetheretherketone (PEEK), polyvinylchloride (PVC). Polypropylene (PP), polyethylene (PE), synthetic rubber mixtures of ethylene propylene diene (EPDM).

In the 1K coating systems, the film-forming polymer preferably does not comprise any functional groups since the film formation is due to physical drying, or else double binds if the drying takes place due to a mixture of oxidative curing and physical drying.

The film-forming polymer, which dries purely physically, is preferably selected from the group of the acrylate polymers, for example of the trade name Degalan from EVONIK®. If a polymer which also cures oxidatively is preferred, it is typically selected from the group of the alkyd binders. These belong chemically to the polyesters and are formed by condensation of alcohols and multiprotic acids with addition of fatty acids to modify the properties. These are differentiated according to the level of oil content, which controls the drying characteristics. In the case of an oil content below 40%, this is referred to as a short oil alkyd which air dries. At an oil content between 40 and 60%, this is referred to as a medium oil alkyd resin which is oven dried. At an oil content over 60%, a non-drying alkyd is obtained.

Preferably used in the formulation according to the invention is a short oil air drying alkyl resin, for example from WORLEEKyd®. The polymerization takes place via the double bonds of the unsaturated fatty acid esters under the influence of oxygen. Particularly noteworthy here is polyunsaturated α-linolenic acid. Siccatives are typically used to accelerate the curing. These preferably take the form of octoates. For example, cobalt octoates or calcium octoates. Used in the formulation according to the invention is an Octa-Soligen® Cobalt 6 and an Octa-Soligen® Calcium 10 in combination with a novel siccative Borchi® OXY-Coat from BORCHERS®. Also conceivable, however, are cobalt octoates with the trade names Octa-Soligen® Cobalt 10 or Octa-Soligen® Cobalt 12. In addition, also manganese octoates under the trade name Octa-Soligen® Manganese 10 or else zirconium octoates under the trade name Octa-Soligen® Zirconium 18 from BORCHERS®. Manganese octoate (AKDRY Mn Octoate 6%) and zirconium octoate are also obtainable from AMERICAN ELEMENTS®. Calcium octoates are also obtainable from PATCHEM® LTD under the trade name Calcium Octoate 10%. Furthermore, it is also possible to use siccatives based on barium, cerium, lithium or strontium. Nowadays, modern drying substances based on metal soaps of various carboxylic acids are also available. An example, based on 2-ethylhexanoic acid, is from BORCHERS® under the trade name Octa-Soligen® 203.

If the drying should proceed too quickly, so-called antiskinning agents based on, for example, ketoximes, substituted phenols or aldoximes, are added. These form reversible complexes with siccatives. Oximes are available, for example, from BODO MÖLLER® CHEMIE under the trade names Dura® MEKO or Duroxim P or butanone oxime is available from FISHER SCIENTIFIC® under the trade name Alfa Aesar® 2.

However, dilution with a suitable organic solvent is always necessary to ensure good processability. Xylene is preferably used in the formulation according to the invention. Also conceivable is the use of aliphatic hydrocarbons.

In the case of the 2K coating systems, the film-forming polymer preferably comprises functional groups reactive with an isocyanate-containing curing agent, an amine-containing curing agent or with a catalyst.

The film-forming polymer is preferably selected from the group of the hydroxyl-functional acrylate polymers, polyester polymers, polyurethane polymers and/or polyether polymers, polyoxypropyleneamines, amino-functional acrylate polymers or polyester polymers and polycarbamates reactive with an isocyanate-containing curing agent.

Such polymers typically have reactive hydroxyl groups. It is particularly preferable to employ polymers having a plurality of hydroxyl-functional groups. Hydroxyl-functional acrylates are obtainable, inter alia, from Alinex® under the trade names MACRYNAL® or SETALUX®. Examples of hydroxyl-functional polyesters are, inter alia, commercially available under the trade name DESMOPHEN® or SETAL®. Usable and commercially available hydroxyl-functional polyethers are obtainable, inter alia, under the trade name TERATHANE® or POLYMEG®.

Preferably, the tested 2K coating according to the invention includes a curing agent selected from the group of the aliphatic or cycloaliphatic isocyanates.

Examples of isocyanate-containing curing agents are monomeric isocyanates, polymeric isocyanates and isocyanate prepolymers. Polyisocyanates are preferred over monomeric isocyanates on account of their lower toxicity. Examples of polyisocyanates are isocyanurates, uretdiones and blurets based on diphenylmethane diisocyanate (MDI), toluene diisocyanate (TDI), hexamethylene diisocyanates (HDI) and isophorone diisocyanate (IPDI). Examples of commercially available products are those under trade name DESMODUR® from Covestro or VESTANAT from Evonik Industries. Known products are DESMODUR® N3200. DESMODUR® N3300, DESMODUR® N3600 DESMODUR® N75, DESMODUR® XP2580, DESMODUR® Z4470, DESMODUR® XP2585 and DESMODUR® VL from Covestro. Further examples are VESTANAT® HAT 2500 LV, VESTANAT® HB 2640 LV or VESTANAT® T 1890E from Evonik Industries. Examples or isocyanate prepolymers are DESMODUR® E XP 2863, DESMODUR® XP 2599 or DESMODUR® XP 2406 from Covestro. Further isocyanate prepolymers known to those skilled in the art may be used.

It is conceivable to use catalysts for curing. The catalysts that follow, selected from organic Sn(IV), Sn(II), Zn, Bi compounds or tertiary amines, may be used.

Preference is given to using catalysts selected from the group of organotin catalysts, titanates or zirconates, organometallic compounds of aluminium, iron, calcium, magnesium, zinc or bismuth. Lewis acids or organic acids/bases, linear or cyclic amidines, guanidines or amines or a mixture thereof.

Curing catalysts used are preferably organic tin compounds, for example dibutyltin diacetylacetonate, dibutyltin diacetate, dibutyltin dioctoate, or dioctyltin dilaurate, dioctyltin diacetyacetonate, dioctyltin diketanoate, dioctylstannoxane, dioctyltin oxide, preferably dioctyltin diacetylacetonate, dioctyltin dilaurate, dioctyltin diketanoate, dioctylstannoxane, dioctyltin dicarboxylate, dioctyltin oxide, particularly preferably dioctyltin dicarboxylate and dioctyltin dilaurate. In addition, it is also possible to use zinc salts such as zinc octoate, zinc acetylacetonate and zinc 2-ethylcaproate, or tetraalkylammonium compounds such as N,N,N-trimethyl-N-2-hydroxypropylammonium hydroxide, N,N,N-trimethyl-N-2-hydroxypropylammonium 2-ethylhexanoate or choline 2-ethylhexanoate. Preference is given to the use of zinc octoate (zinc 2-ethylhexanoate) and of the tetraalkylammonium compounds, particular preference being given to zinc octoate. Further preferred are bismuth catalysts, e.g. TIB Kat (TIB Mannheim) or Borchi® catalysts, titanates, e.g. titanium(IV) isopropoxide, iron(III) compounds, e.g. iron(III) acetylacetonate, aluminium compounds, such as aluminium triisopropoxide, aluminium tri-sec-butoxide and other alkoxides and also aluminium acetylacetonate, calcium compounds, such as calcium disodium ethylenediaminetetraacetate or calcium diacetylacetonate, or else amines, examples being triethylamine, tributylamine, 1,4-diazabicyclo[2.2.2]octane, 1,8-diazabicyclo[5.4.0]undec-7-ene, 1,5 diazabicyclo[4.3.0]non-5-ene, N,N-bis(N,N-dimethyl-2-aminoethyl)methylamine, N,N-dimethylcyclohexylamine, N,N dimethylphenylamine. N-ethylmorpholine, etc. Also preferred as catalysts are organic or inorganic Brønsted acids such as acetic acid, trifluoroacetic acid, methanesulfonic acid, p-toluenesulfonic acid or benzoyl chloride, hydrochloric acid, phosphoric acid and the monoesters and/or diesters thereof, for example butyl phosphate, (iso)propyl phosphate, dibutyl phosphate, etc. Also preferred are guanidine-bearing organic and organosilicon compounds. It is of course also possible to use combinations of two or more catalysts. In addition, it is also possible to use photolatent bases as catalysts, as described in WO 2005/100482.

The curing catalyst is preferably used in amounts of 0.01% to 5.0% by weight, more preferably 0.05% to 4.0% by weight and especially preferably 0.1% to 3% by weight, based on the total mass of the curable composition.

Employment of solvents may also be useful. These solvents may serve, for example, to lower the viscosity of the uncrosslinked binder, or may facilitate application onto the surface. Solvents contemplated include in principle all solvents and also solvent mixtures. The choice of a suitable solvent may be made from the group of the alkanes, alkenes, alkynes, benzene and aromatics with aliphatic and aromatic substituents, carboxylic esters, linear and cyclic ethers and, at high pressures, carbon dioxide as well, halogenated aliphatic or aromatic hydrocarbons, ketones or aldehydes, lactones (γ-butyrolactone), lactams (e.g. N-methyl-2-pyrrolidone), nitriles, nitro compounds, tertiary carboxamides (dimethylformamide), urea derivatives such as tetramethylurea or dimethylpropyleneurea (DMPU), sulfoxides such as dimethyl sulfoxide (DMSO), sulfones such as sulfolane, carbonic esters such as dimethyl carbonate or ethylene carbonate. Mention may also be made of protic solvents such as water, methanol, ethanol, n- and isopropanol and other alcohols, primary and secondary amines, carboxylic acids and esters thereof, and also anhydrides, primary and secondary amides such as formamide. Preference is given to solvents accepted in coating applications such as ethers, e.g. t-butyl methyl ether, esters, for example ethyl acetate or n-butyl acetate, tert-butyl acetate or diethyl carbonate, and alcohols, for example ethanol and the various regioisomers of propanol and butanol. Preferred solvents also include aromatic and/or aliphatic solvents such as benzene, toluene or naphtha cuts.

It is also possible to add, if required, one or more substances selected from the group comprising co-crosslinkers, flame retardants, deaerating agents, curing agents, antimicrobial and preservative substances, dyes, colourants and pigments, anti-freeze agents, fungicides, spraying assistants, wetting agents, fragrances, light stabilizers, free-radical scavengers, UV absorbers and stabilizers, especially stabilizers to counter thermal and/or chemical stress and/or stress caused by ultraviolet and visible light.

UV stabilizers are preferably known products based on hindered phenolic systems or benzotriazoles. Light stabilizers used may be, for example, those known as HALS amines. Employable stabilizers include for example the products or product combinations known to those skilled in the art comprising for example Tinuvin® stabilizers (BASF), for example Tinuvin® stabilizers (BASF), for example Tinuvin® 1130, Tinuvin® 292 or else Tinuvin® 400, preferably Tinuvin® 1130 in combination with Tinuvin® 292. The amount in which they are used is determined by the degree of stabilization required.

Suitable for colouring in coatings are pigments based on titanium dioxide and other white pigments, inorganic colour pigments such as iron oxides, chromium pigments, ultramarine pigments, organic colour pigments such as azo pigments, phthalocyanine pigments, perylene pigments, quinacridone pigments, also carbon blacks. To improve corrosion protection typical anticorrosion pigments such as zinc phosphate are also used.

Fillers are preferably precipitated or ground chalk, inorganic carbonates in general, precipitated or ground silicates, precipitated or fumed silicas, glass powders, hollow glass beads (called bubbles), metal oxides, such as $TiO_2$, $Al_2O_3$, natural or precipitated barium sulfates, finely ground quartzes, sand, aluminium trihydrates, talc, mica, cristobalite flours, reinforcing fibres, such as glass fibres or carbon fibres, long-fibre or short-fibre wollastonites, cork, carbon black or graphite. Hydrophobized fillers may be advantageously employed, since these products have a lower water ingress and improve the storage stability of the formulations.

It is also conceivable to use the substances according to the invention in UV curing formulations. Here, curing takes place by free radical polymerization.

The film-forming polymers are preferably selected from the group of the acrylates and methacrylates. In most cases, a mixture of, for example, a polyether acrylate from BASF with the trade name Laromer LR 8945® and a polyester acrylate from BASF® with the trade name Laromer LR8799 or Laromer LR8800 is used.

Suitable as reactive solvent are hexadiol diacrylate or trimethylolpropane triacrylate.

The present invention is described by way of example in the examples cited below, without the invention, the scope of application of which results from the entirety of the description, being restricted to the embodiments mentioned in the examples.

I. Preparation Examples

General Methods
Gel Permeation Chromatography (GPC):

GPC measurements for determination of polydispersity ($M_w/M_n$), weight-average molar mass ($M_w$) and number-average molar mass ($M_n$) were conducted under the following measurement conditions: SDV 1000/10 000 Å column combination (length 65 cm), temperature 30° C., THF as mobile phase, flow rate 1 m/min, sample concentration 10 g/l, RI detector, evaluation against polypropylene glycol standard.

Determination of the Content of Epoxy Groups in the Polybutadiene (Epoxy Content, Epoxidation Level)

The content of epoxy groups was determined with the aid of $^{13}$C-NMR spectroscopy. A Bruker Avance 400 NMR spectrometer was used. The samples were for this purpose dissolved in deuterochloroform. The epoxy content is defined as the proportion of epoxidized butadiene units in mol % based on the entirety of all repeat units present in the sample. This corresponds to the number of epoxy groups in the epoxidized polybutadiene divided by the number of double bonds in the polybutadiene used.

Determination of the Acid Value:

The acid value was determined by a titration method in accordance with DIN EN ISO 2114.

Preparation of the Adhesion Promoter According to the Invention

Based on the as yet unpublished European patent application EP 19212068.5 or PCT/EP2020/083013 1.1, the steps a)-c) were carried out. As an example, the first example in each case is described with regard to the weight of the component. The weights used and parameters of the intermediate products and end products can be found in the respective tables.

Step a) Preparation of Epoxidized Polybutadienes

An epoxidized polybutadiene was prepared using a polybutadiene of the formula (1) having the structure x=1%, y=24% and z=75% (Polyvest® 110).

Generic Illustration for Example A1:

A 5 L four-necked glass flask was initially charged with 1500 g of Polyvest® 110 and 81.0 g of conc. formic acid in 1500 g of chloroform at room temperature under a nitrogen atmosphere. Subsequently, 300 g of 30% $H_2O_2$ solution (30% by weight $H_2O_2$ based on the total mass of the aqueous solution) was slowly added dropwise and then the solution was heated to 50° C. for 5.5 hours. After the reaction had ended, the mixture was cooled to room temperature, the organic phase was removed and washed four times with dist. $H_2O$. Excess chloroform and residual water were distilled off. 1440 g of the product were obtained, which was admixed with 1000 ppm of Irganox® 1135 and stored under nitrogen.

Evaluation by means of $^{13}$C NMR gave an epoxidation level of about 8.5% of the double bonds. $M_w$=4597 g/mol; $M_n$=1999 g/mol; $M_w/M_n$=2.3

For the other Examples A2-A5, the weights, reaction conditions and evaluations can be found in Table 1. For easier reading, the designation of Examples A1-A5 has been retained for Tables 2 and 3 as well.

TABLE 1

| | Epoxidized polybutadiene | | | | | | | | |
|---|---|---|---|---|---|---|---|---|---|
| | Polybutadiene [g] | Conc. formic acid [g] | CHCl₃ [g] | 30% H₂O₂ sol. [g] | t [h] | $M_n$ [g/mol] | $M_w$ [g/mol] | $M_w/M_n$ | Epoxidation level [%] | Yield [g] |
| A1 | 1500 | 81.0 | 1500 | 300 | 5.5 | 1999 | 4597 | 2.3 | 8.5 | 1440 |
| A2 | 1500 | 81.0 | 1500 | 300 | 7 | 2001 | 4620 | 2.4 | 8.5 | 1425 |
| A3 | 800 | 43.2 | 800 | 160 | 10 | 1982 | 4757 | 2.4 | 8.6 | 771 |
| A4 | 800 | 43.2 | 800 | 160 | 9.5 | 1992 | 4582 | 2.3 | 8.3 | 767 |
| A5 | 800 | 43.2 | 800 | 160 | 10 | 2011 | 4625 | 2.3 | 8.4 | 756 |

Step b) Preparation of Hydroxy-Functional Polybutadienes

The epoxidized polybutadiene A1 from step a) was used to prepare a hydroxylated polybutadiene. The hydroxylation level here is the number of OH groups of the OH-functional polybutadiene divided by the number of double bonds in the polybutadiene used in step a). For the preparation, a 5 L four-necked flask under a nitrogen atmosphere was initially charged with 1400 g of the epoxidized polybutadiene in 1400 g of isobutanol, and with 80 ppmw of trifluoromethanesulfonic acid (based on mass of epoxidized polybutadiene) with stirring. This was followed by heating to 70° C. and stirring of the mixture at this temperature for 6 hours. The reaction mixture became clear during the reaction. After the reaction had ended, the mixture was cooled to room temperature and the solution was neutralized by adding 21.4 g of sat. $NaHCO_3$ solution. The mixture was heated to 115° C. and excess water and excess alcohol were distilled off under reduced pressure. The alcohol recovered by distillation and optionally dried may be reused in subsequent syntheses. The isobutanol distilled off may be dried, for example, by distillation or by addition of drying agents such as molecular sieves. 1455 g of a brownish product were obtained, which was admixed with 1000 ppm or Irganox® 1135 and stored under nitrogen.

Evaluation by means of $^{13}C$-NMR showed complete conversion of all epoxy groups, which gives a hydroxylation level of ca. 8.5%.

$M_w$=6228 g/mol; $M_n$=2196 g/mol; $M_w/M_n$=2.8

The step was carried out analogously for the other examples as well; see Table 2.

TABLE 2

Hydroxy-functional polybutadiene

| | Epoxidized polybutadiene from Table 1 [g] | Isobutanol [g] | Sat. $NaHCO_3$ sol. [g] | t [h] | $M_n$ [g/mol] | $M_w$ [g/mol] | $M_w/M_n$ | Hydroxylation level [%] | Yield [g] |
|---|---|---|---|---|---|---|---|---|---|
| A1 | 1400 | 1400 | 21.4 | 6 | 2196 | 6228 | 2.8 | 8.5 | 1455 |
| A2 | 1400 | 1400 | 21.4 | 4.5 | 2203 | 6080 | 2.8 | 8.5 | 1467 |
| A3 | 725 | 725 | 11.1 | 4.5 | 2331 | 8534 | 3.7 | 8.6 | 747 |
| A4 | 720 | 720 | 11.0 | 5 | 2325 | 7551 | 3.2 | 8.3 | 752 |
| A5 | 700 | 700 | 10.7 | 6 | 2313 | 7898 | 3.4 | 8.4 | 726 |

Step c) Preparation of Alkoxylated Polybutadienes

A 3 litre autoclave was initially charged with 334.0 g of the hydroxy-functional polybutadiene A2 from step b) and 19.2 g of 30% sodium methoxide solution (30% by weight sodium methoxide in methanol based on total mass of the solution) under nitrogen, and the mixture was stirred at 50° C. for 1 hour. Subsequently, the mixture was heated up to 115° C. while stirring and the reactor was evacuated down to an internal pressure of 30 mbar in order to distillatively remove excess methanol and other volatile ingredients present. A mixture of 332 g of ethylene oxide (EO) and 306 g of propylene oxide (PO) were metered in continuously and with cooling over 9 hours at 115° C. and a max. Internal reactor pressure of 3.5 bar (absolute). Continued reaction at 115° C. for 30 minutes was followed by degassing. Volatile components such as residual ethylene oxide and propylene oxide were distilled off under reduced pressure. The product was cooled to 95° C., neutralized with 30% $HPO_4$ to an acid number of 0.1 mg KOH/g, and admixed with 1000 ppm of Irganox® 1135. Water was removed by distillation under reduced pressure and precipitated salts were filtered off. 1076 g of the medium-viscous and orange coloured, clear alkoxylated polybutadiene were isolated and stored under nitrogen.

$M_w$=13 481 g/mol; $M_n$=3209 g/mol; $M_w/M_n$=4.2

Further examples and comparative examples according to Table 3 were carried out analogously with the weights and reaction conditions listed. The alkoxylation modifications are evident from the "feed profile" column.

TABLE 3

Alkoxylated polybutadiene

| | Hydroxylated polybutadiene [g] from Table 2 | Feed profile | t [h] | Cat. [g] | $M_n$ [g/mol] | $M_w$ [g/mol] | $M_w/M_n$ | AN [mg KOH/g] | Yield [g] | Physical state |
|---|---|---|---|---|---|---|---|---|---|---|
| A1 or VGA1 | 532 of A1 | 586 g PO | 8 | 30.3 | 3233 | 13650 | 4.5 | 0.1 | 1062 | liquid |

TABLE 3-continued

Alkoxylated polybutadiene

| | Hydroxylated polybutadiene [g] from Table 2 | Feed profile | t [h] | Cat. [g] | $M_n$ [g/mol] | $M_w$ [g/mol] | $M_w/M_n$ | AN [mg KOH/g] | Yield [g] | Physical state |
|---|---|---|---|---|---|---|---|---|---|---|
| A2 or VGA2 | 555 of A2 | 332 g EO/ 306 g PO | 6.5 | 31.6 | 3209 | 13481 | 4.2 | 0.1 | 1013 | liquid |
| A3 | 455 of A3 | 752 g PO | 9 | 25.9 | 2938 | 17391 | 5.92 | 0.1 | 1134 | liquid |
| A4 or VGA4 | 627 of A4 | 520 g PO/ 920 g EO | 10 | 35.8 | 4373 | 18940 | 4.3 | 0.1 | 7269 | liquid |
| A5 | 303 of A5 | 835 g PO | 9 | 17.3 | 2999 | 20638 | 6.88 | 0.1 | 1052 | liquid |

Step d) Preparation of the Polyester-Polyether-Modified Polybutadienes According to the Invention by Esterification of the Alkoxylated Polybutadiene
Generic Illustration for Example PPA1:

A 500 mL four-necked flask was initially charged under nitrogen with 120 g of the alkoxylated polybutadiene from step c), 40 g of ε-caprolactone (Aldrich) and 40 g of δ-valerolactone (Aldrich) and the mixture heated to 40° C. After addition of 0.95 g of Tyzor® NBZ (0.5% by weight based on the total mass of the reaction mixture), the mixture was heated to 160° C. and stirred at this temperature for 4 hours. After cooling, 188 g of an orange-brown pasty product were isolated.

Further examples were carried out with the weights (% by weight) and reaction conditions listed in Table 4.

TABLE 4

Inventive compound

| Inventive polyester-polyether-modified polybutadiene | Alkoxylated polybutadiene [g] from Table 3 | Alkoxylated polybutadiene/ ε-caprolactone/ δ-valerolactone (wt. %) | Mn [g/mol] | Mw [g/mol] | Mw/Mn | Yield [g] | Physical state |
|---|---|---|---|---|---|---|---|
| PPA1 | A1 | 60/20/20 | 2937 | 14032 | 4.78 | 198 | liquid |
| PPA2 | A2 | 60/40/0 | 2855 | 14072 | 4.93 | 198 | solid |
| PPA3 | A3 | 80/20/0 | 2882 | 16556 | 5.75 | 188 | liquid |
| PPA4 | A4 | 80/20/0 | 3725 | 18839 | 5.06 | 188 | pasty |
| PPA5.1 | A5 | 80/20/0 | 3034 | 17914 | 5.90 | 188 | liquid |
| PPA5.2 | A5 | 60/40/0 | 3334 | 17730 | 5.32 | 198 | pasty |
| PPA5.3 | A5 | 60/20/20 | 2751 | 17054 | 6.20 | 198 | liquid |

I.

II. Application Examples

General Conditions

Where values are expressed in % in the context of the present invention, these are in % by weight unless otherwise stated. In the case of compositions the values reported in % are based on the entire composition unless otherwise stated. Where reference is hereinbelow made to averages these are number averages unless otherwise stated. Where reference is hereinbelow made to measured values these measured values were determined at a pressure of 101 325 Pa, a temperature of 23° C. and ambient relative humidity of approx. 40% unless otherwise stated.

Instruments
  Speedmixer, from Hauschild Engineering, model FAC 150.1 FVZ
  Drying oven, from Binder, instrument type FDL 115 E2
  Dispermat, from Getzmann, instrument type CV2-SIP
  Cross-cut tester, DIN EN ISO 2409, CCP cross-cut stencil set
  Cutter knife, from HEYCO, model 01864000000
  Adhesive tape, from TESA, 4651
  Laboratory balance, Sartorius MSE 6202 S 100 DO
  Spiral coating bar, from BYK Gardner, 100 μm Methods Adhesion Test For optimal testing of adhesive performance of adhesion promoters, an initial preliminary test by means of the Andreas cut test has proven to be useful. If a sample is evaluated with a 1 (no flaking), the cross-cut test in accordance with DIN EN ISO 2409 then follows. In this way, time and effort can be minimized. It is sometimes also sufficient to use only the value of the Andreas cut test.

a) Preliminary Test Using the Andreas Cut Test

Using a cutter knife, two scores are cut through into the coating, at 90° to each other along a ruler and of a respective length of 3 to 4 cm, penetrating as far as the substrate. In the case of plastic substrates, care should be taken not to cut the substrate as far as possible. Subsequently, the scored area is masked with a TESA adhesive tape 4651, pressed firmly and then peeled off. Evaluation is shown in the FIGURE.

b) Cross-Cut Test is Carried Out in Accordance With DIN EN ISO 2409.

Compatibility testing is determined by a visual evaluation of the coating film by means of the scale (Table 5).

TABLE 5

Scale of the visual assessment of the coating film:

| | Appearance/Features |
|---|---|
| 1 | Clear |
| 2 | Slightly cloudy |
| 3 | Slightly cloudy and/or specks |

TABLE 5-continued

Scale of the visual assessment of the coating film:

Appearance/Features

4 Cloudy, specks and/or pinholes
5 Very cloudy and/or craters, specks, pinholes, wetting defects Materials

TABLE 6

Raw materials for the coating formulations

| Trade name | Chemical description | Intended use | Company |
| --- | --- | --- | --- |
| Degalan ® 64/12 | Air-drying linear polyacrylate | Film-forming polymer | Evonik |
| Macrynal ® SM 510/60 LG | Hydroxy-functional polyacrylate | Film-forming polymer | Allnes |
| Setal ® 1603 | Hydroxyl-containing polyester | Film-forming polymer | Allnex |
| Desmodur ® N 3200 | Polyisocyanate | Curing agent | Covestro |
| Desmodur ® N 3600 | Polyisocyanate | Curing agent | Covestro |
| Butyl acetate | Butyl acetate | Solvent | Sigma-Aldrich |
| Butyldiglycol acetate | Butyidiglycol acetate | Solvent | |
| Solvesso 100 | Aromatic hydrocarbon in the distillation range of 166° C.-181° C. | Solvent | Brenntag |
| Hydrosol A 170 | Aromatic hydrocarbon | Solvent | DHC Solvent Chemie GmbH |
| Xylene | Isomeric mixture of aromatic hydrocarbons | Solvent | Sigma-Aldrich |
| Methoxypropyl acetate | Carboxylic esters | Solvent | Sigma-Aldrich |
| TIB KAT ® 318 | Dioctyltin dicarboxylate | Catalyst | TIB Chemicals AG |
| TIB KAT ® 218 | Dibutyltin dilaurate | Catalyst | TIB Chemicals AG |
| TEGO ® Flow 300 | Acrylate-containing polymer | Levelling additive | Evonik |
| TEGO ® Airex 990 | Defoamer/deaerater | Defoamer/deaerater | Evonik |

Preparation of the Coating Formulations

For the application tests, initially three coating formulations E1 to E3 were prepared corresponding to the constituents and quantities from Table 7.

Coating Formulation E1:

The constituents (P1+P8) with the amounts listed in Table 3 were extrapolated to 2 kg and weighed into a sheet metal can having a 2.5 L volume capacity. The mixture was stirred using a Dispermat from Getzmann, instrument type CV2-SIP, with a dispersion disk having a diameter of 8 cm and at a speed of 500 rpm for 20 minutes.

Coating Formulation E2:

The constituents (P2+P5 to P8, P11+P12 and P14+P15), without curing agent (P5), with the amounts listed in Table 6, were extrapolated to 2 kg. Firstly, P2 was weighed into a sheet metal can having a 2.5 L volume capacity. The positions P5 to P8 and P11+P12, P14+P15 were added successively with stirring. The mixture was prepared using a Dispermat from Getzmann, instrument type CV2-SIP, with a dispersion disk having a diameter of 8 cm and at a speed of 500 rpm and, after addition of the last position, stirred for a further 20 minutes. Care was taken to ensure that smears were no longer to be seen.

Coating Formulation E3:

For the coating formulation E2, all constituents (P3+P4, P7 and P9+P10, P13+P15) except the curing agent (P4) were extrapolated to 2 kg using the amounts listed in Table 3 and weighed into a sheet metal can having a 2.5 L volume capacity. The mixture was stirred using a Dispermat from Getzmann, instrument type CV2-SIP, with a dispersion disk having a diameter of 8 cm and at a speed of 500 rpm. Firstly, the binder (P3) is initially charged, all other constituents (P7 and P9+P10, P13+P15) being added with stirring. After addition of the last position, the mixture was stirred for a further 20 minutes.

1) Preparation of the Coating Formulations for the Application Tests

The inventive compounds PPA1-PPA5.3, comparative examples VGA1, VGA2, VGA4 and PV 110 (Polyvest® 110) were each added to 5% by weight based on the respective solids content (for E1=30%; E2=57.5%; E3=56.3%). The coating formulations E1 to E3 without addition of the polybutadiene served as a blank reference. VGA1, VGA2, VGA4 are alkoxylated polybutadienes without subsequent esterification.

To incorporate the inventive compounds PPA1-PPA5.3, comparative examples VGA1, VGA2, VGA4 and PV 110 (Polyvest® 110), in each case 20 g of the coating formulations E1 to E3 (in the 2K systems including curing agent) were weighed into a 50 ml PP screw-top jar (Dürrmann GmbH & Co KG, 85664 Hohenlinden) and mixed for two minutes at 2000 revolutions per minute using a speed mixer (Hauschild Engineering, Type DAC 150 FVZ). The prepared coating formulations were then applied to various substrates using a 100 μm spiral coating bar so as to achieve a dry layer thickness of ca. 40 μm in the dried state. E1 was applied to glass. E2 was applied to glass, ABS and aluminium. E3 was applied to steel A38 Q panels. The applied substrates were dried and cured at room temperature (23° C.) overnight and then at 60° C. for 2 days.

TABLE 7

Composition of 100 g of each of the coating formulations

| Position P. | Raw materials [g] | E1 | E2 | E3 |
| --- | --- | --- | --- | --- |
| 1 | Degalan ® 64/12 | 30.0 | | |
| 2 | Macrynal ® SM 510/60 LG | | 60.1 | |

TABLE 7-continued

Composition of 100 g of each of the coating formulations

| Position P. | Raw materials [g] | E1 | E2 | E3 |
|---|---|---|---|---|
| 3 | Setal ® 1603 | | | 55.7 |
| 4 | Desmodur ® N 3600 | | | 30.6 |
| 5 | Desmodur ® N 3200 | | 21.3 | |
| 6 | Methoxypropyl acetate | | 4.6 | |
| 7 | Butyl acetate | 70 | 5.5 | 11.1 |
| 8 | Solvesso 100 | | 3.4 | |
| 9 | Hydrosol A 170 | | | 1.1 |
| 10 | Butyldiglycol acetate | | | 1.1 |
| 11 | Xylene | | 4.2 | |
| 12 | TIB KAT ® 318 | | 0.3 | |
| 13 | TIB KAT ® 218 | | | 0.3 |
| 14 | TEGO ® Flow 300 | | 0.5 | |
| 15 | TEGO ® Airex 990 | | 0.1 | 0.1 |

The results are shown in the following tables.

TABLE 8

Coating formulation E1 on glass

| Products | PO (mass) | Chemical modification Feed profile — Alkoxylated polybutadiene/ ε-caprolactone/ δ-valerolactone (wt. %) | Adhesion Andreas cut/ Cross-cut | Compat- ibility |
|---|---|---|---|---|
| E1 | | | 5/— | 1 |
| PV 110 | | | 1/GT5 | 5 |
| PPA5.1 | 835 g | 80/20/0 | 1/GT5 | 1 |
| PPA5.2 | 835 g | 60/40/0 | 1/GT5 | 1 |
| PPA5.3 | 835 g | 60/20/20 | 1/GT5 | 1 |

The coating formulation E1 as blank reference showed no adhesion to glass as expected. Comparative example PV 110 showed a comparable adhesion but the coating film was cloudy and had specks and/or pinholes.

The coating formulations with the polyester-polyether-modified polybutadienes according to the invention likewise showed good adhesion to glass and at the same time very good compatibility.

TABLE 9

Coating formulation E2 on glass

| Products | EO/PO (mass) taken from Table 3 | Chemical modification Feed profile — Alkoxylated polybutadiene/ ε-caprolactone/ δ-valerolactone (wt. %) | Adhesion Andreas cut/ Cross-cut | Compat- ibility |
|---|---|---|---|---|
| E2 | | | 6 | 1 |
| PV 110 | | | 6 | 4 |
| PPA1 | 0/586 g | 60/20/20 | 1/GT0 | 3 |
| VGA2 | 332 g/306 g | | 2 | 1 |
| PPA2 | 332 g/306 g | 60/40/0 | 1/GT0 | 2 |
| PPA3 | 0/752 g | 80/20/0 | 1/GT0 | 4 |
| PPA5.2 | 0/835 g | 60/40/0 | 1/GT0 | 3 |
| PPA5.3 | 0/835 g | 60/20/20 | 1/GT0 | 3 |

The inventive coating formulations E2 on glass showed better adhesion than those in the comparative examples. Compatibility is at least better than that of PV110. The coating formulation with the non-esterified polyether-modified polybutadiene did not adhere as well to glass as that of PPA2.

TABLE 10

Coating formulation E2 on ABS

| Products | EO/PO (mass) taken from Table 3 | Chemical modification Feed profile — Alkoxylated polybutadiene/ ε-caprolactone/ δ-valerolactone (wt. %) | Adhesion Andreas cut/ Cross-cut | Compat- ibility |
|---|---|---|---|---|
| E2 | | | 6 | 1 |
| PV 110 | | | 6 | 4 |
| PPA1 | 0/586 g | 60/20/20 | 2 | 3 |
| VGA2 | 332 g/306 g | | 4 | 1 |
| PPA2 | 332 g/306 g | 60/40/0 | 1/GT0 | 2 |
| PPA5.1 | 0/835 g | 80/20/0 | 1/GT0 | 3 |
| PPA5.2 | 0/835 g | 60/40/0 | 1/GT0 | 3 |
| PPA5.3 | 0/835 g | 60/20/20 | 1/GT0 | 3 |

All of the coating formulations according to the invention showed very good adhesion to ABS. Compared to the known PV110, they are also more compatible.

TABLE 11

Coating formulation E2 on Aluminium A36 Q-Panel

| Products | EO/PO (mass) taken from Table 3 | Chemical modification Feed profile — Alkoxylated polybutadiene/ ε-caprolactone/ δ-valerolactone (wt. %) | Adhesion Andreas cut/ Cross-cut | Compat- ibility |
|---|---|---|---|---|
| E2 | | | 6 | 1 |
| PV 110 | | | 5 | 4 |
| VGA1 | 0/586 g | | 5 | 2 |
| PPA1 | 0/586 g | 60/20/20 | 1/GT0 | 3 |
| VGA2 | 332 g/306 g | | 3 | 1 |
| PPA2 | 332 g/306 g | 60/40/0 | 1/GT0 | 2 |
| VGA4 | 520 g/920 g | | 3 | 1 |
| PPA4 | 520 g/920 g | 80/20/0 | 1/GT0 | 1 |
| PPA5.1 | 0/835 g | 80/20/0 | 1/GT0 | 3 |
| PPA5.2 | 0/835 g | 60/40/0 | 1/GT0 | 3 |
| PPA5.3 | 0/835 g | 60/20/20 | 1/GT0 | 3 |

Here also the coating formulations according to the invention in terms of their adhesion are superior to the known PV110 and the non-esterified polyether-modified polybutadienes,

TABLE 12

Coating formulation E3 on Steel S36 Q-Panel

| Products | EO/PO (mass) taken from Table 3 | Chemical modification Feed profile — Alkoxylated polybutadiene/ ε-caprolactone/ δ-valerolactone (wt. %) | Adhesion Andreas cut/ Cross-cut | Compat- ibility |
|---|---|---|---|---|
| E3 | | | 5 | 1 |
| PV 110 | | | 5 | 5 |
| VGA1 | 0/586 g | | 3 | 3 |
| PPA1 | 0/586 g | 60/20/20 | 1/GT5 | 1 |

TABLE 12-continued

Coating formulation E3 on Steel S36 Q-Panel

| | Chemical modification Feed profile | | | |
|---|---|---|---|---|
| Products | EO/PO (mass) taken from Table 3 | Alkoxylated polybutadiene/ ε-caprolactone/ δ-valerolactone (wt. %) | Adhesion Andreas cut/ Cross-cut | Compat-ibility |
| VGA5 | 0/835 g | | 1/GT3 | 4 |
| PPA5.2 | 0/835 g | 60/40/0 | 1/GT5 | 1 |

Here, the inventive coating formulations E3 on steel, both in terms of their adhesion property and in their compatibility, showed their superiority over the unesterified polyether-modified polybutadienes and the known PV 110.

The invention claimed is:

1. A compound that is polyether-modified polybutadiene, wherein the polyether-modified polybutadiene comprises repeat units selected from the group consisting of divalent radicals

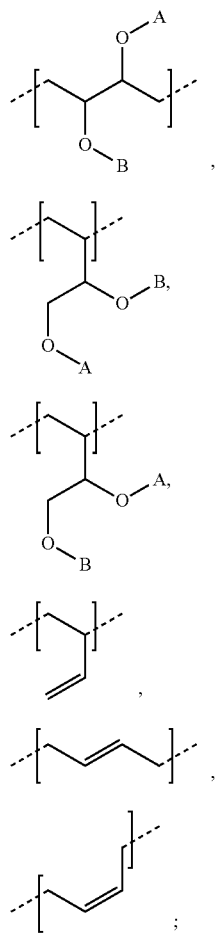

(U), (V), (W), (X), (Y), (Z)

wherein
A is in each case independently a monovalent organic radical or a hydrogen radical;
B is in each case independently a radical of the formula (4a)

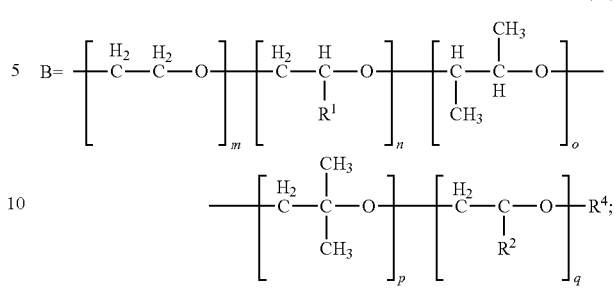

$R^1$ is in each case independently a monovalent hydrocarbon radical having 1 to 16 carbon atoms;
$R^2$ is a radical of the formula $—CH_2O—R^3$;
$R^3$ is in each case independently a monovalent hydrocarbon radical having 3 to 18 carbon atoms;
$R^4$ is hydrogen or acyl;
m, n, o, p and q are each independently 0 to 300, with the proviso that a sum total of m, n, o, p and q is greater than 1;
for every permutation of the repeat units (U), (V), (W), (X), (Y) and (Z) and of repeat units in B, with the proviso that a sum total of all repeat units (U), (V) and (W) divided by a sum total of all repeat units (U), (V), (W), (X), (Y) and (Z) is >0%, and
wherein B has at least one ester group.

2. The compound according to claim 1, wherein the $R^4$ is acyl in the at least one ester group formed by reaction with at least one compound (I) selected from the group consisting of cyclic anhydrides, lactones, dilactides, and cyclic carbonates, as a monomer or comonomer, and
wherein the compound has repeat units selected from the group consisting of radicals

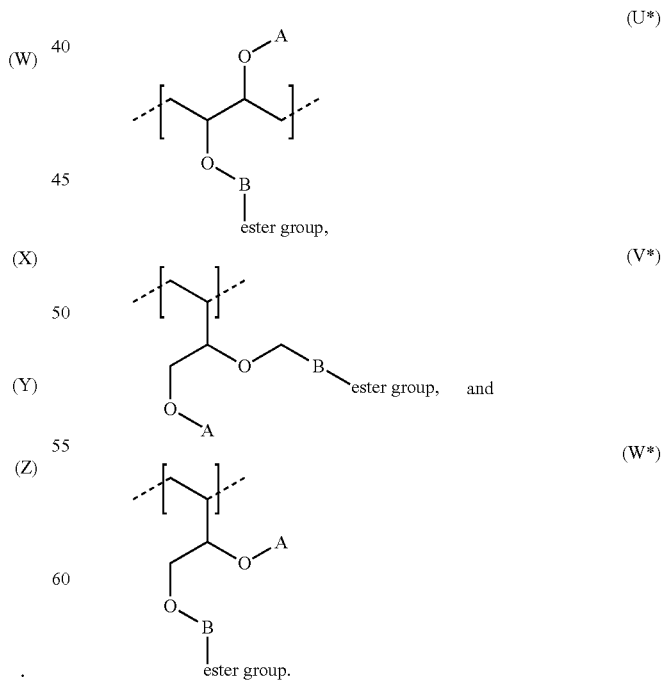

(U*), (V*), (W*)

3. The compound according to claim 2, wherein the at least one compound (I) is at least one cyclic anhydride in a pure form or in a mixture, wherein the at least one cyclic anhydride is a saturated, unsaturated or aromatic cyclic dicarboxylic anhydride.

4. The compound according to claim 2, wherein the at least one compound (I) is at least one lactone in a pure form or in a mixture, wherein the at least one lactone is selected from the group consisting of valerolactones, caprolactones and butyrolactones, which may be unsubstituted or substituted by organic radicals.

5. The compound according to claim 1, wherein the sum total of all repeat units (U), (V) and (V) divided by the sum total of all repeat units (U), (V), (W), (X), (Y) and (Z) is from >0% to 70%.

6. The compound according to claim 1, wherein a number-average molar mass $M_n$ of the polyether-modified polybutadiene is from 200 g/mol to 20,000 g/mol.

7. The compound according to claim 1, wherein 0% to 80% of double bonds present are 1,2 vinyl double bonds, and 20% to 100% of the double bonds present are 1,4 double bonds.

8. The compound according to claim 1, wherein an average molar mass of B is from 100 g/mol to 20,000 g/mol.

9. A process for preparing the compound according to claim 1, the process comprising:
 a) reacting at least one polybutadiene with at least one epoxidizing reagent to give at least one epoxy-functional polybutadiene;
 b) reacting the at least one epoxy-functional polybutadiene with at least one hydroxy-functional compound to give at least one hydroxy-functional polybutadiene;
 c) reacting the at least one hydroxy-functional polybutadiene with at least one epoxy-functional compound to give at least one polyether-modified polybutadiene, and
 d) reacting the at least one polyether-modified polybutadiene with at least one compound to give at least one polyether-polyester-modified polybutadiene.

10. The process according to claim 9, further comprising:
 e) colour lightening the at least one polyether-modified polybutadiene.

11. The process according to claim 9, wherein double bonds of the at least one polybutadiene are 0% to 80% 1,2 vinyl double bonds and 20% to 100% 1,4 double bonds, based on the total number of double bonds.

12. The process according to claim 9, wherein a number-average molar mass $M_n$ of the at least one polybutadiene is from 200 g/mol to 20,000 g/mol.

13. The process according to claim 9, in step a) wherein >0% to 70% of double bonds of all the at least one polybutadiene(s) used are converted to epoxides.

14. The process according to claim 9, wherein the at least one epoxidizing reagent comprises performic acid.

15. The process according to claim 9, wherein the at least one hydroxy-functional compound is at least one monofunctional alcohol having 1 to 6 carbon atoms.

16. The process according to claim 9, wherein, in b), a total number of hydroxyl groups in the at least one hydroxy-functional compound to a total number of epoxy groups in the at least one epoxy-functional polybutadiene is from >1:1 to 50:1.

17. The process according to claim 9, wherein, in b), an acid is used as a catalyst.

18. The process according to claim 9, wherein, in c), the at least one epoxy-functional compound is an alkylene oxide having 2 to 18 carbon atoms, and/or a glycidyl compound.

19. The process according to claim 9, wherein an alkoxylation catalyst is used in c).

20. The process according to claim 9, wherein, in d), the at least one compound is selected from the group consisting of cyclic anhydrides, lactones, dilactides, and cyclic carbonates, as a monomer or comonomer.

21. The process according to claim 9, wherein an initiator catalyst is used in d).

22. A composition, comprising the compound according to claim 1.

23. A method, comprising:
 mixing the composition according to claim 22 into a further composition,
 wherein the further composition is one selected from the group consisting of a coating material composition, a paint composition, a lacquer composition, a printing ink composition, an inkjet composition, a sealant composition, and an adhesive composition.

24. The compound according to claim 1, wherein the compound is an adhesion promoter, a defoamer, a dispersing additive, a wetting aid or a glide additive.

* * * * *